US012750121B2

(12) United States Patent
Sakhnini et al.

(10) Patent No.: US 12,750,121 B2
(45) Date of Patent: Sep. 29, 2026

(54) POLARIZATION AND ANTENNA PANEL CONFIGURATION AND COMMUNICATION DIVERSITY CONFIGURATION

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/346,648

(22) Filed: Jul. 3, 2023

(65) Prior Publication Data

US 2023/0344502 A1 Oct. 26, 2023

Related U.S. Application Data

(62) Division of application No. 17/449,368, filed on Sep. 29, 2021, now Pat. No. 11,728,877.

(60) Provisional application No. 63/198,403, filed on Oct. 15, 2020, provisional application No. 63/198,401, filed on Oct. 15, 2020, provisional application No. 63/198,400, filed on Oct. 15, 2020, provisional application No. 63/198,399, filed on Oct. 15, 2020.

(51) Int. Cl.
*H04B 7/08* (2006.01)
*H04B 7/06* (2006.01)

(52) U.S. Cl.
CPC ........... *H04B 7/08* (2013.01); *H04B 7/06956* (2023.05)

(58) Field of Classification Search
CPC .. H04B 7/0604; H04B 7/0606; H04B 7/0691; H04B 7/0695; H04B 7/08; H04B 7/0874; H04B 7/088; H04B 7/10
See application file for complete search history.

(56) References Cited

U.S. PATENT DOCUMENTS 8,619,671 B2 * 12/2013 Kwon ...................... H04B 7/10 370/328
11,095,347 B1 * 8/2021 Nilsson ................. H04L 5/0048
11,881,919 B2 * 1/2024 Grossmann .......... H04B 7/0478
12,155,439 B2 * 11/2024 Zhang .................. H04B 7/0628
2006/0111056 A1 * 5/2006 Dutta ....................... H04B 1/40 455/132
2008/0218424 A1 9/2008 Blanton
2013/0273870 A1 10/2013 Shi
(Continued)

FOREIGN PATENT DOCUMENTS

CN 110830209 A 2/2020
JP 2001203672 A 7/2001
(Continued)

OTHER PUBLICATIONS

International Search Report and Written Opinion—PCT/US2021/071655—ISA/EPO—Feb. 8, 2022.

*Primary Examiner* — David B Lugo
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, information associated with identifying a communication diversity configuration. The UE may receive, from the base station, a transport block on a downlink in accordance with the communication diversity configuration. Numerous other aspects are provided.

20 Claims, 19 Drawing Sheets

(56) References Cited

U.S. PATENT DOCUMENTS

2018/0234129 A1 8/2018 Chae et al.
2018/0287683 A1 10/2018 Subramanian et al.
2019/0306850 A1 10/2019 Zhang et al.
2020/0178089 A1* 6/2020 Sevindik ............... H04W 16/32
2021/0153215 A1 5/2021 Guan et al.
2021/0184755 A1* 6/2021 Bengtsson ........... H04B 17/345
2021/0289487 A1* 9/2021 Zander ................. H04B 7/0695
2022/0051677 A1 2/2022 Park et al.
2022/0109977 A1* 4/2022 Zander .................... H04W 8/24
2022/0123821 A1 4/2022 Sakhnini et al.
2022/0329313 A1* 10/2022 Nilsson .................. H04B 7/088
2023/0094549 A1* 3/2023 Matsumura .......... H04B 7/0404 375/267
2023/0146269 A1* 5/2023 Petersson ............. H04B 7/0628 375/267
2023/0318684 A1* 10/2023 Abinader ........... H04B 7/06952 370/329
2024/0187059 A1* 6/2024 Liu ....................... H04L 5/0094

FOREIGN PATENT DOCUMENTS

WO 2018131945 A1 7/2018
WO 2020030050 A1 2/2020

* cited by examiner

POLARIZATION AND ANTENNA PANEL CONFIGURATION AND COMMUNICATION DIVERSITY CONFIGURATION

CROSS-REFERENCE TO RELATED APPLICATIONS

This Patent Applications is a divisional of U.S. patent application Ser. No. 17/449,368, filed Sep. 29, 2021, entitled "POLARIZATION AND ANTENNA PANEL CONFIGURATION AND COMMUNICATION DIVERSITY CONFIGURATION," which claims priority to U.S. Provisional Patent Application No. 63/198,399, filed on Oct. 15, 2020, entitled "POLARIZATION AND ANTENNA PANEL CONFIGURATION," U.S. Provisional Patent Application No. 63/198,400, filed on Oct. 15, 2020, entitled "POLARIZATION AND ANTENNA PANEL CONFIGURATION REPORTING," U.S. Provisional Patent Application No. 63/198,401, filed on Oct. 15, 2020, entitled "POLARIZATION AND ANTENNA PANEL CONFIGURATION FOR UPLINK TRANSMISSION," and U.S. Provisional Patent Application No. 63/198,403, filed on Oct. 15, 2020, entitled "COMMUNICATION DIVERSITY CONFIGURATION FOR DOWNLINK TRANSMISSION" and assigned to the assignee hereof. The disclosures of the prior Applications are considered part of and are incorporated by reference into this Patent Applications.

FIELD OF THE DISCLOSURE

Aspects of the present disclosure generally relate to wireless communication and to techniques and apparatuses for polarization and antenna panel configuration and communication diversity configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a base station includes transmitting, to a user equipment (UE), information associated with identifying a communication diversity configuration; and transmitting, to the UE, a transport block on a downlink in accordance with the communication diversity configuration.

In some aspects, a method of wireless communication performed by a UE includes receiving, from a BS, information associated with identifying a communication diversity configuration; and receiving, from the BS, a transport block on a downlink in accordance with the communication diversity configuration.

In some aspects, a base station for wireless communication includes a memory; and one or more processors coupled to the memory, the one or more processors configured to: transmit, to a UE, information associated with identifying a communication diversity configuration; and transmit, to the UE, a transport block on a downlink in accordance with the communication diversity configuration.

In some aspects, a UE for wireless communication includes a memory; and one or more processors coupled to the memory, the one or more processors configured to: receive, from a BS, information associated with identifying a communication diversity configuration; and receive, from the BS, a transport block on a downlink in accordance with the communication diversity configuration.

In some aspects, a non-transitory computer-readable medium storing a set of instructions for wireless communication includes one or more instructions that, when executed by one or more processors of a base station, cause the base station to: transmit, to a UE, information associated with identifying a communication diversity configuration; and transmit, to the UE, a transport block on a downlink in accordance with the communication diversity configuration.

In some aspects, a non-transitory computer-readable medium storing a set of instructions for wireless communication includes one or more instructions that, when executed by one or more processors of a UE, cause the UE to: receive, from a BS, information associated with identifying a communication diversity configuration; and receive, from the BS, a transport block on a downlink in accordance with the communication diversity configuration.

In some aspects, an apparatus for wireless communication includes means for transmitting, to a UE, information associated with identifying a communication diversity configuration; and means for transmitting, to the UE, a transport block on a downlink in accordance with the communication diversity configuration.

In some aspects, an apparatus for wireless communication includes means for receiving, from a BS, information associated with identifying a communication diversity configuration; and means for receiving, from the BS, a transport block on a downlink in accordance with the communication diversity configuration.

In some aspects, a method of wireless communication performed by a UE includes receiving, from a base station, antenna configuration information associated with configuring a set of antennas of the UE; and receiving, from the base station, downlink data using an antenna configuration selected based at least in part on the antenna configuration information.

In some aspects, a method of wireless communication performed by a base station includes transmitting, to a UE, antenna configuration information associated with configuring a set of antennas of the UE; and transmitting, to the UE, downlink data using a base station antenna configuration corresponding to a UE antenna configuration selected based at least in part on the antenna configuration information.

In some aspects, a UE for wireless communication includes a memory and one or more processors operatively coupled to the memory, the memory and the one or more processors configured to: receive, from a base station, antenna configuration information associated with configuring a set of antennas of the UE; and receive, from the base station, downlink data using an antenna configuration selected based at least in part on the antenna configuration information.

In some aspects, a base station for wireless communication includes a memory and one or more processors operatively coupled to the memory, the memory and the one or more processors configured to: transmit, to a UE, antenna configuration information associated with configuring a set of antennas of the UE; and transmit, to the UE, downlink data using a base station antenna configuration corresponding to a UE antenna configuration selected based at least in part on the antenna configuration information.

In some aspects, a non-transitory computer-readable medium storing a set of instructions for wireless communication includes one or more instructions that, when executed by one or more processors of a UE, cause the UE to: receive, from a base station, antenna configuration information associated with configuring a set of antennas of the UE; and receive, from the base station, downlink data using an antenna configuration selected based at least in part on the antenna configuration information.

In some aspects, a non-transitory computer-readable medium storing a set of instructions for wireless communication includes one or more instructions that, when executed by one or more processors of a base station, cause the base station to: transmit, to a UE, antenna configuration information associated with configuring a set of antennas of the UE; and transmit, to the UE, downlink data using a base station antenna configuration corresponding to a UE antenna configuration selected based at least in part on the antenna configuration information.

In some aspects, an apparatus for wireless communication includes means for receiving, from a base station, antenna configuration information associated with configuring a set of antennas of the apparatus; and means for receiving, from the base station, downlink data using an antenna configuration selected based at least in part on the antenna configuration information.

In some aspects, an apparatus for wireless communication includes means for transmitting, to a UE, antenna configuration information associated with configuring a set of antennas of the UE; and means for transmitting, to the UE, downlink data using a base station antenna configuration corresponding to a UE antenna configuration selected based at least in part on the antenna configuration information.

In some aspects, a method of wireless communication performed by a UE includes transmitting, to a base station, an antenna configuration report identifying an antenna configuration for a set of antenna panels of the UE; and communicating with the base station using the antenna configuration based at least in part on transmitting the antenna configuration report.

In some aspects, a method of wireless communication performed by a base station includes receiving, from a UE, an antenna configuration report identifying a UE antenna configuration for a set of antenna panels of the UE; and communicating with the UE using a base station antenna configuration corresponding to the UE antenna configuration based at least in part on receiving the antenna configuration report.

In some aspects, a UE for wireless communication includes a memory; and one or more processors operatively coupled to the memory, the memory and the one or more processors configured to: transmit, to a base station, an antenna configuration report identifying an antenna configuration for a set of antenna panels of the UE; and communicate with the base station using the antenna configuration based at least in part on transmitting the antenna configuration report.

In some aspects, a base station for wireless communication includes a memory; and one or more processors operatively coupled to the memory, the memory and the one or more processors configured to: receive, from a UE, an antenna configuration report identifying a UE antenna configuration for a set of antenna panels of the UE; and communicate with the UE using a base station antenna configuration corresponding to the UE antenna configuration based at least in part on receiving the antenna configuration report.

In some aspects, a non-transitory computer-readable medium storing a set of instructions for wireless communication includes one or more instructions that, when executed by one or more processors of a UE, cause the UE to: transmit, to a base station, an antenna configuration report identifying an antenna configuration for a set of antenna panels of the UE; and communicate with the base station using the antenna configuration based at least in part on transmitting the antenna configuration report.

In some aspects, a non-transitory computer-readable medium storing a set of instructions for wireless communication includes one or more instructions that, when executed by one or more processors of a base station, cause the base station to: receive, from a UE, an antenna configuration report identifying a UE antenna configuration for a set of antenna panels of the UE; and communicate with the UE using a base station antenna configuration corresponding to the UE antenna configuration based at least in part on receiving the antenna configuration report.

In some aspects, an apparatus for wireless communication includes means for transmitting, to a base station, an antenna configuration report identifying an antenna configuration for a set of antenna panels of the apparatus; and means for communicating with the base station using the antenna configuration based at least in part on transmitting the antenna configuration report.

In some aspects, an apparatus for wireless communication includes means for receiving, from a UE, an antenna configuration report identifying a UE antenna configuration for a set of antenna panels of the UE; and means for communicating with the UE using a base station antenna configuration corresponding to the UE antenna configuration based at least in part on receiving the antenna configuration report.

In some aspects, a method of wireless communication performed by a UE includes receiving, from a base station, antenna configuration information associated with configuring a set of panels of the UE; and transmitting, to the base station, uplink data using an antenna configuration selected based at least in part on the antenna configuration information.

In some aspects, a method of wireless communication performed by a base station includes transmitting, to a UE, antenna configuration information associated with configuring a set of panels of the UE; and receiving, from the UE, uplink data using a base station antenna configuration corresponding to a UE antenna configuration selected based at least in part on the antenna configuration information.

In some aspects, a UE for wireless communication includes a memory; and one or more processors operatively coupled to the memory, the memory and the one or more processors configured to: receive, from a base station, antenna configuration information associated with configuring a set of panels of the UE; and transmit, to the base station, uplink data using an antenna configuration selected based at least in part on the antenna configuration information.

In some aspects, a base station for wireless communication includes a memory; and one or more processors operatively coupled to the memory, the memory and the one or more processors configured to: transmit, to a UE, antenna configuration information associated with configuring a set of panels of the UE; and receive, from the UE, uplink data using a base station antenna configuration corresponding to a UE antenna configuration selected based at least in part on the antenna configuration information.

In some aspects, a non-transitory computer-readable medium storing a set of instructions for wireless communication includes one or more instructions that, when executed by one or more processors of a UE, cause the UE to: receive, from a base station, antenna configuration information associated with configuring a set of panels of the UE; and transmit, to the base station, uplink data using an antenna configuration selected based at least in part on the antenna configuration information.

In some aspects, a non-transitory computer-readable medium storing a set of instructions for wireless communication includes one or more instructions that, when executed by one or more processors of a base station, cause the base station to: transmit, to a UE, antenna configuration information associated with configuring a set of panels of the UE; and receive, from the UE, uplink data using a base station antenna configuration corresponding to a UE antenna configuration selected based at least in part on the antenna configuration information.

In some aspects, an apparatus for wireless communication includes means for receiving, from a base station, antenna configuration information associated with configuring a set of panels of the apparatus; and means for transmitting, to the base station, uplink data using an antenna configuration selected based at least in part on the antenna configuration information.

In some aspects, an apparatus for wireless communication includes means for transmitting, to a UE, antenna configuration information associated with configuring a set of panels of the UE; and means for receiving, from the UE, uplink data using a base station antenna configuration corresponding to a UE antenna configuration selected based at least in part on the antenna configuration information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
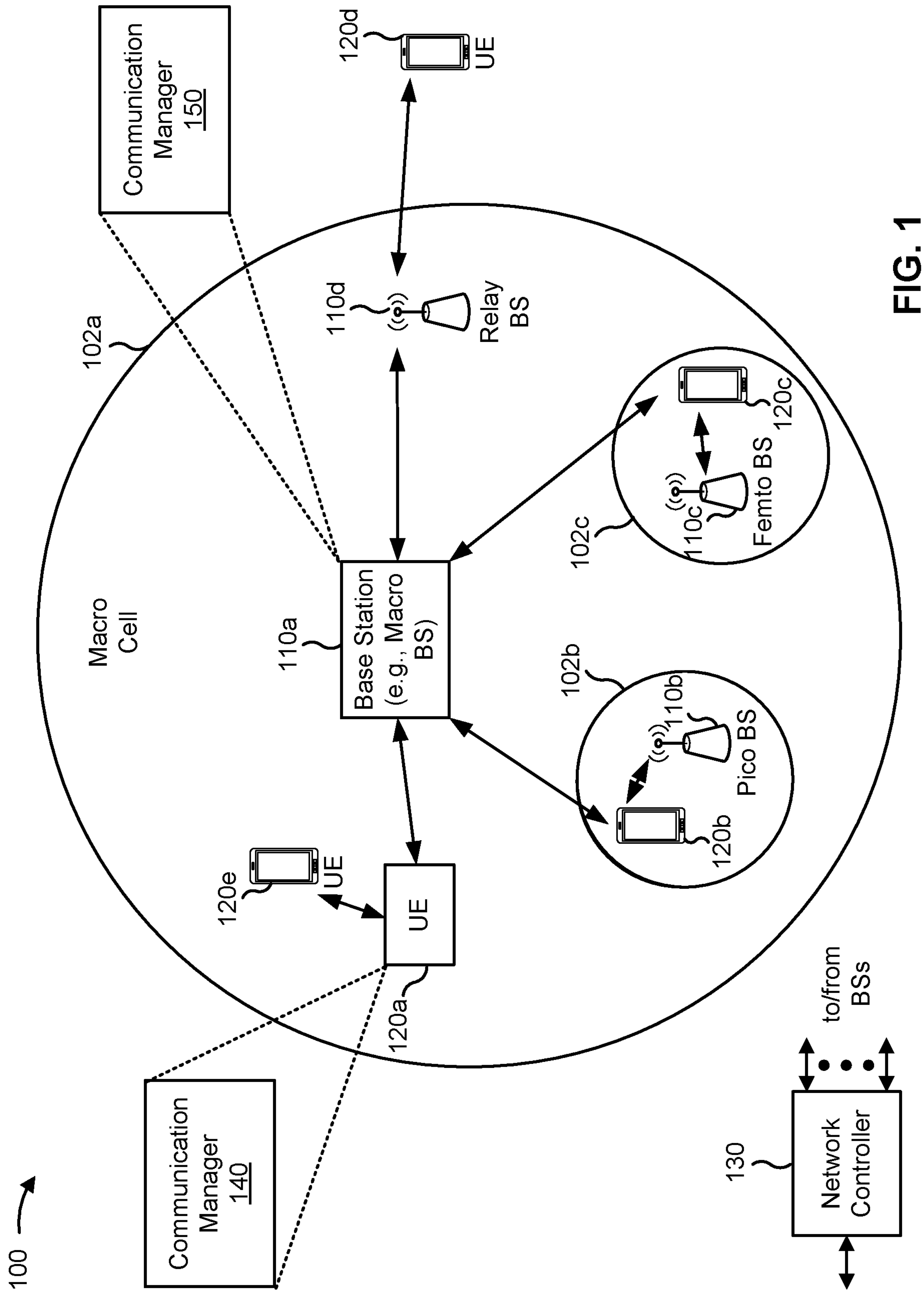
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the base station 110 may include a communication manager 150. As described in more detail elsewhere herein, the communication manager 150 may transmit information associated with identifying a communication diversity configuration; and transmit a transport block on a downlink in accordance with the communication diversity configuration. Additionally, or alternatively, the communication manager 150 may transmit, to a UE, antenna configuration information associated with configuring a set of antennas of the UE; and transmit, to the UE, downlink data using a base station antenna configuration corresponding to a UE antenna configuration selected based at least in part on the antenna configuration information. Additionally, or alternatively, the communication manager 150 may receive, from a UE, an antenna configuration report identifying a UE antenna configuration for a set of antenna panels of the UE; and communicate with the UE using a base station antenna configuration corresponding to the UE antenna configuration based at least in part on receiving the antenna configuration report. Additionally, or alternatively, the communication manager 150 may transmit, to a UE, antenna configuration information associated with configuring a set of panels of the UE; and receive, from the UE, uplink data using a base station antenna configuration corresponding to a UE antenna configuration selected based at least in part on the antenna configuration information. Additionally, or alternatively, the communication manager 150 may perform one or more other operations described herein.

In some aspects, the UE 120 may include a communication manager 140. As described in more detail elsewhere herein, the communication manager 140 may receive information associated with identifying a communication diversity configuration; and receive a transport block on a downlink in accordance with the communication diversity configuration. Additionally, or alternatively, the communication manager 140 may receive, from a base station, antenna configuration information associated with configuring a set of antennas of the UE; and receive, from the base station, downlink data using an antenna configuration selected based at least in part on the antenna configuration information. Additionally, or alternatively, the communication manager 140 may transmit, to a base station, an antenna configuration report identifying an antenna configuration for a set of antenna panels of the UE; and communicate with the base station using the antenna configuration based at least in part on transmitting the antenna configuration report. Additionally, or alternatively, the communication manager 140 may receive, from a base station, antenna configuration information associated with configuring a set of panels of the UE; and transmit, to the base station, uplink data using an antenna configuration selected based at least in part on the antenna configuration information. Additionally, or alternatively, the communication manager 140 may perform one or more other operations described herein.

As indicated above, FIG. 1 is provided as an example. Other examples may differ from what is described with regard to FIG. 1.

Figure 2:
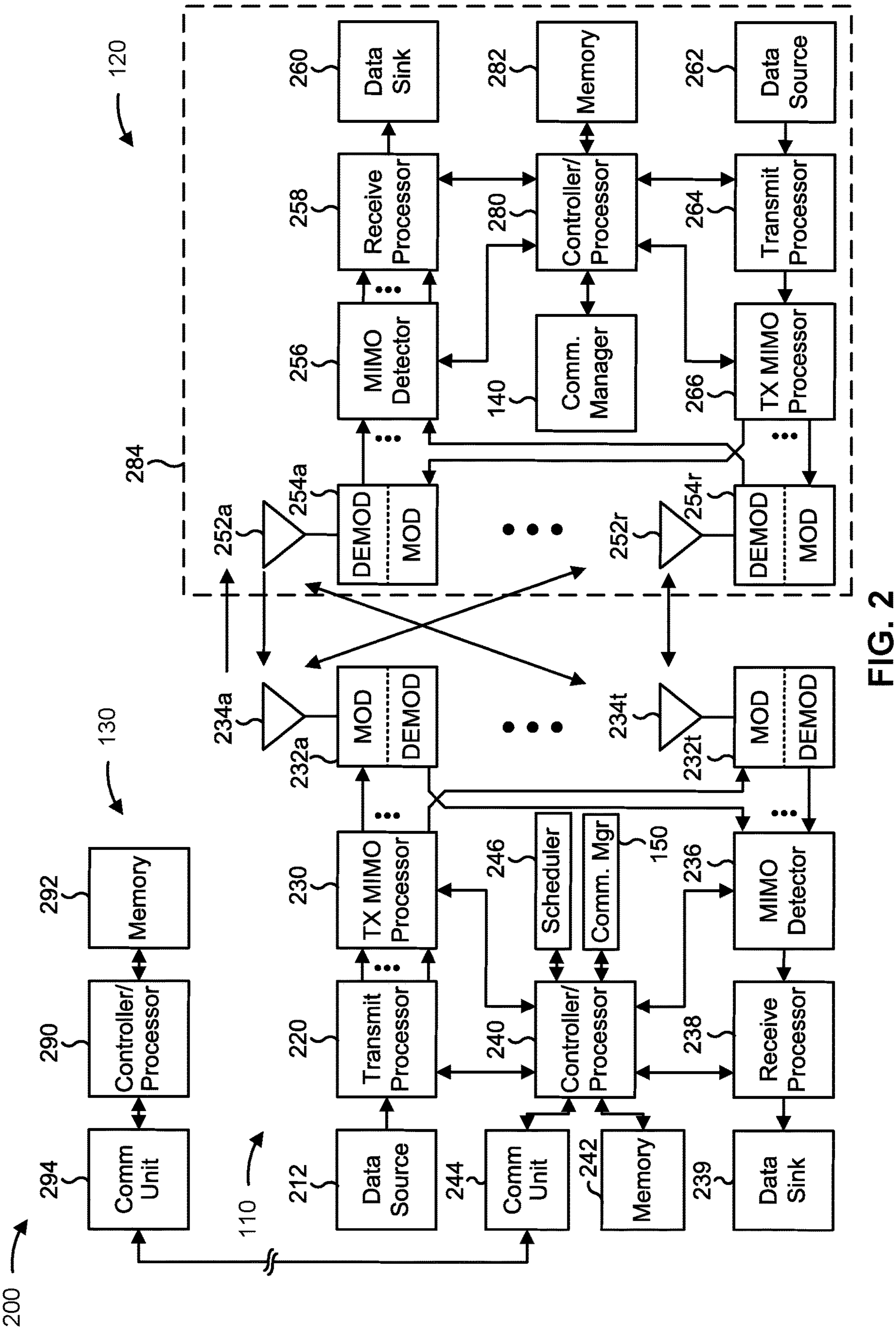
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-18)

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with polarization and antenna panel configuration and communication diversity configuration, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9 through process 1600 of FIG. 16, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9 through process 1600 of FIG. 16, and/or other processes as described herein. In some examples, executing instructions may include running the instructions, converting the instructions, compiling the instructions, and/or interpreting the instructions, among other examples.

In some aspects, the base station 110 includes means for transmitting information associated with identifying a communication diversity configuration; and/or means for transmitting a transport block on a downlink in accordance with the communication diversity configuration. Additionally, or alternatively, the base station 110 includes means for transmitting, to a UE, antenna configuration information associated with configuring a set of antennas of the UE; and means for transmitting, to the UE, downlink data using a base station antenna configuration corresponding to a UE antenna configuration selected based at least in part on the antenna configuration information. Additionally, or alternatively, the base station 110 includes means for receiving, from a UE, an antenna configuration report identifying a UE antenna configuration for a set of antenna panels of the UE; and means for communicating with the UE using a base station antenna configuration corresponding to the UE antenna configuration based at least in part on receiving the antenna configuration report. Additionally, or alternatively, the base station 110 includes means for transmitting, to a UE, antenna configuration information associated with configuring a set of panels of the UE; and means for receiving, from the UE, uplink data using a base station antenna configuration corresponding to a UE antenna configuration selected based at least in part on the antenna configuration information. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for receiving information associated with identifying a communication diversity configuration; and/or means for receiving a transport block on a downlink in accordance with the communication diversity configuration. Additionally, or alternatively, the UE 120 includes means for receiving, from a base station, antenna configuration information associated with configuring a set of antennas of the UE 120; and means for receiving, from the base station, downlink data using an antenna configuration selected based at least in part on the antenna configuration information. Additionally, or alternatively, the UE 120 includes means for transmitting, to a base station, an antenna configuration report identifying an antenna configuration for a set of antenna panels of the UE 120; and means for communicate with the base station using the antenna configuration based at least in part on transmitting the antenna configuration report. Additionally, or alternatively, the UE 120 includes means for receiving, from a base station, antenna configuration information associated with configuring a set of panels of the UE 120; and means for transmit, to the base station, uplink data using an antenna configuration selected based at least in part on the antenna configuration information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
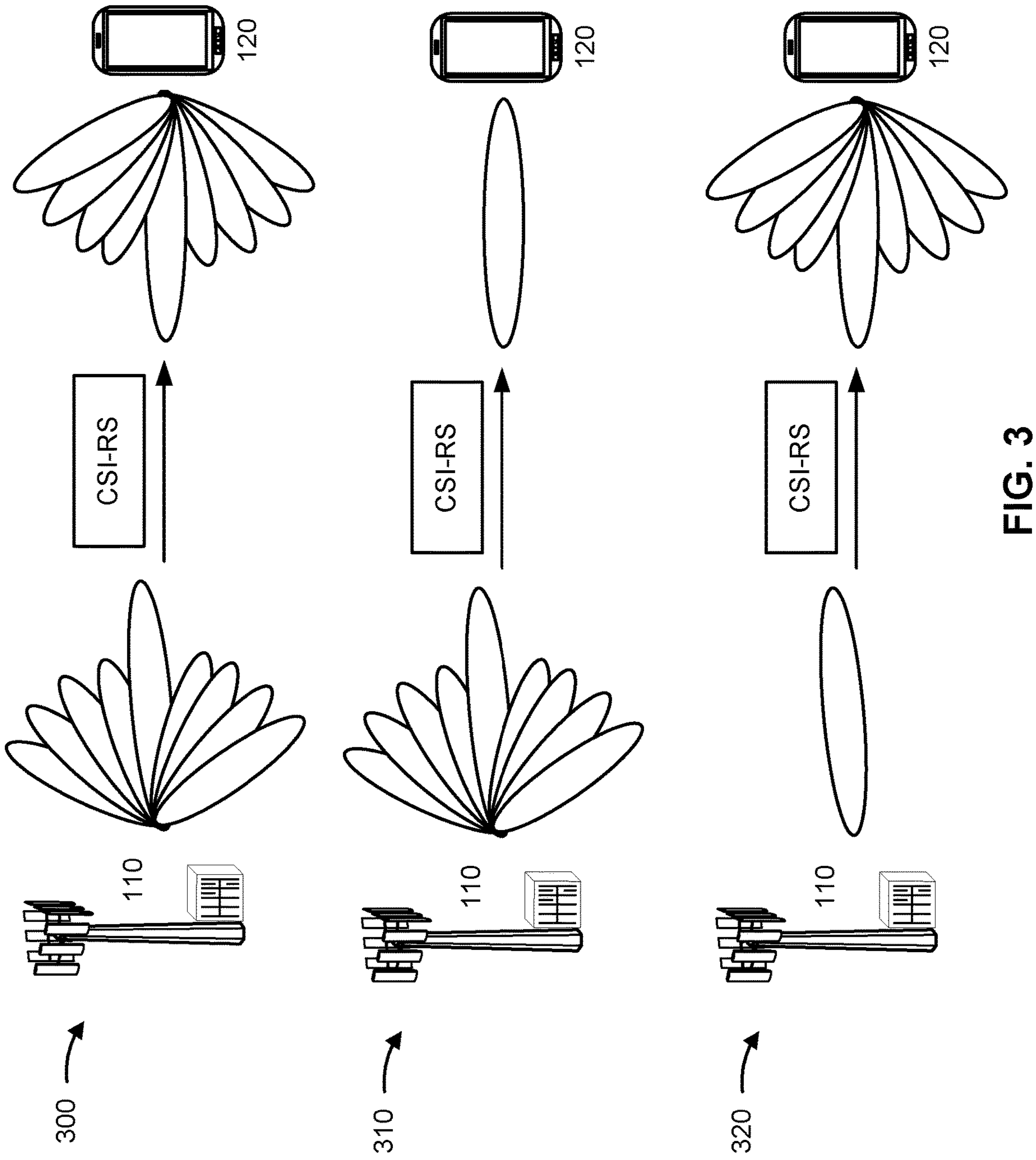
FIG. 3 is a diagram illustrating an example of channel state information (CSI) reference signal (CSI-RS) beam management procedures, in accordance with the present disclosure.

FIG. 3 is a diagram illustrating examples 300, 310, and 320 of CSI-RS beam management procedures, in accordance with the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or TRP, between a mobile termination node and a control node, between an integrated access and backhaul (IAB) child node and an IAB parent node, between a scheduled node and a scheduling node, and/or the like). In some aspects, the UE 120 and the base station 110 may be in a connected state (e.g., a radio resource control (RRC) connected state and/or the like).

As shown in FIG. 3, example 300 may include a base station 110 and a UE 120 communicating to perform beam management using CSI-RSs. Example 300 depicts a first beam management procedure (e.g., P1 CSI-RS beam management). The first beam management procedure may be referred to as a beam selection procedure, an initial beam acquisition procedure, a beam sweeping procedure, a cell search procedure, a beam search procedure, and/or the like. As shown in FIG. 3 and example 300, CSI-RSs may be configured to be transmitted from the base station 110 to the UE 120. The CSI-RSs may be configured to be periodic (e.g., using RRC signaling and/or the like), semi-persistent (e.g., using media access control (MAC) control element (MAC-CE) signaling and/or the like), and/or aperiodic (e.g., using downlink control information (DCI) and/or the like).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same reference signal (RS) resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 300 has been described in connection with CSI-RSs, the first beam management process may also use synchronization signal blocks (SSBs) for beam management in a similar manner as described above.

As shown in FIG. 3, example 310 may include a base station 110 and a UE 120 communicating to perform beam management using CSI-RSs. Example 310 depicts a second beam management procedure (e.g., P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 3 and example 310, CSI-RSs may be configured to be transmitted from the base station 110 to the UE 120. The CSI-RSs may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 3, example 320 depicts a third beam management procedure (e.g., P3 CSI-RS beam management). The third beam management procedure may be referred to as a beam refinement procedure, a UE beam refinement procedure, a receive beam refinement procedure, and/or the like. As shown in FIG. 3 and example 320, one or more CSI-RSs may be configured to be transmitted from the base station 110 to the UE 120. The CSI-RSs may be configured to be aperiodic (e.g., using DCI and/or the like). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 3 is provided as an example of beam management procedures. Other examples of beam management procedures may differ from what is described with respect to FIG. 3. For example, the UE 120 and the base station 110 may perform the third beam management procedure before performing the second beam management procedure, the UE 120 and the base station 110 may perform a similar beam management procedure to select a UE transmit beam, and/or the like.

Figure 4A:
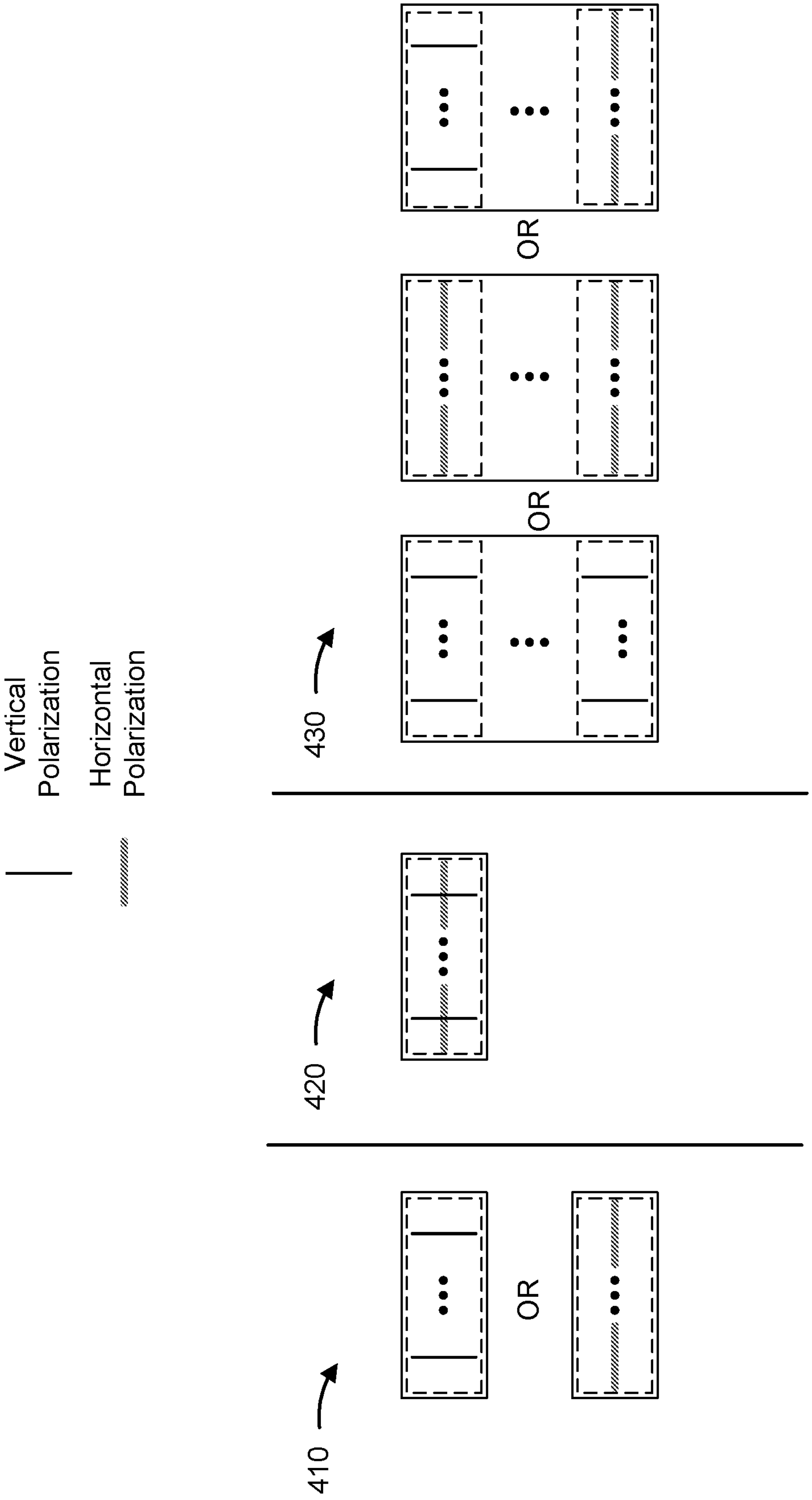
FIGS. 4A and 4B are diagrams illustrating examples of UE antenna configurations, in accordance with the present disclosure.
Figure 4B:
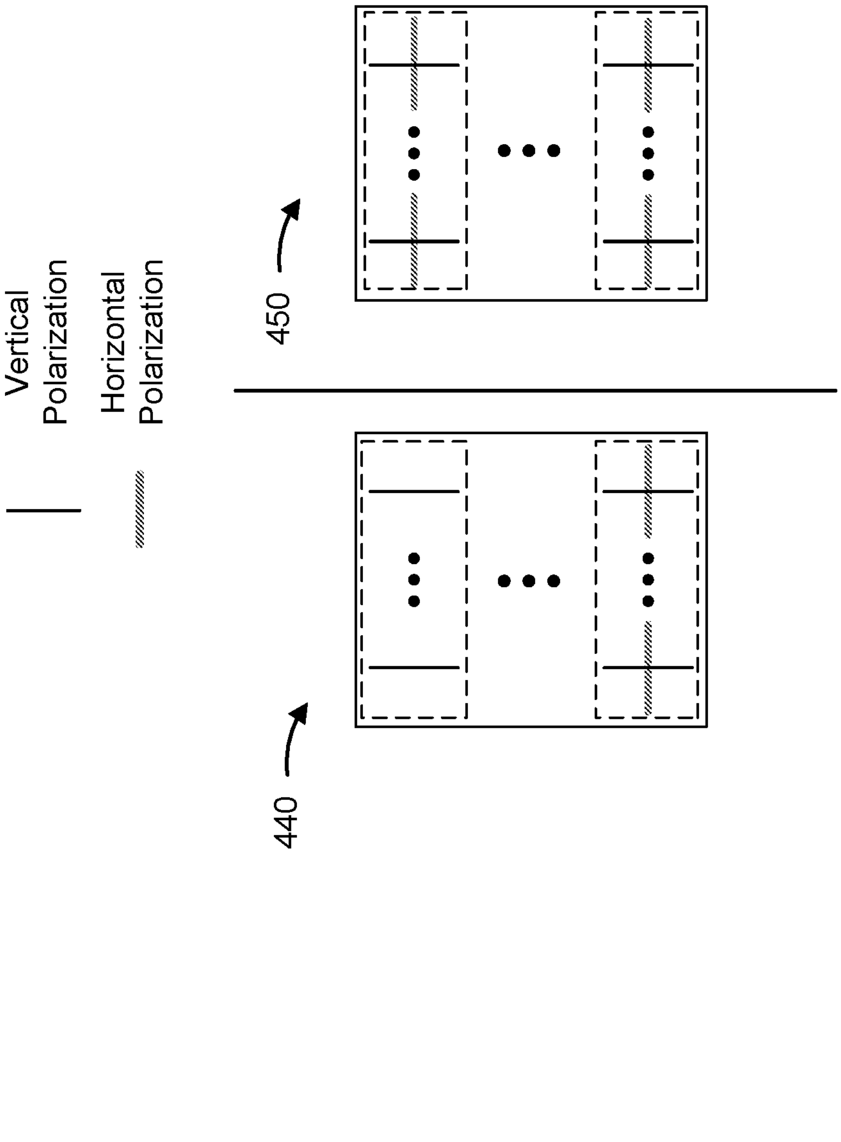

FIGS. 4A-4B are diagrams illustrating examples 410-450 of UE antenna configurations, in accordance with the present disclosure.

As shown in FIG. 4A, and by reference number 410, in a first antenna configuration, a UE may include a single antenna panel capable of a single polarization. For example, the UE may include a single antenna panel capable of vertical polarization or a single antenna panel capable of horizontal polarization. In such cases, the single antenna panel may be capable of transmitting a particular quantity of beams (e.g., horizontally polarized beams or vertically polarized beams).

As further shown in FIG. 4A, and by reference number 420, in a second antenna configuration, a UE may include a single antenna panel capable of dual polarization. For example, the UE may include a single antenna panel capable of both horizontal polarization and vertical polarization. In this case, the UE may be capable of using horizontal-only polarization, vertical-only polarization, combined horizontal and vertical polarization, or a combination thereof (e.g., using dynamic switching).

As further shown in FIG. 4A, and by reference number 430, in a third antenna configuration, a UE may include a plurality of antenna panels where each antenna panel is capable of a single polarization. For example, the UE may include a plurality of antenna panels capable of vertical polarization, a plurality of antenna panels capable of horizontal polarization, or a plurality of antenna panels where one or more antenna panels are capable of vertical polarization and one or more antenna panels are capable of horizontal polarization.

As further shown in FIG. 4B, and by reference number 440, in a fourth antenna configuration, a UE may include a plurality of antenna panels where at least one antenna panel is capable of dual polarization and at least one antenna panel is not capable of dual polarization. For example, the UE may include one or more antenna panels capable of both horizontal polarization and vertical polarization (e.g., and which may operate in a horizontal-only state, a vertical-only state, or a combined horizontal and vertical state). In this case, the UE may further include one or more antenna panels with a single polarization. For example, the UE may include two or more mixed polarization antenna panels and no single-polarization antenna panels, two or more mixed polarization antenna panels and one or more single-polarization antenna panels, a single mixed polarization antenna panel and one or more single-polarization antenna panels.

As further shown in FIG. 4B, and by reference number 450, in a fifth antenna configuration, a UE may include a plurality of antenna panels capable of dual polarization. For example, the UE may include two or more antenna panels capable of both horizontal polarization, vertical polarization, or a combination of horizontal polarization and vertical polarization. In this case, the UE may not include any antenna panels capable of only a single polarization.

As indicated above, FIGS. 4A-4B are provided as examples. Other examples may differ from what is described with respect to FIGS. 4A-4B.

As described above, a UE may include one or more antenna panels capable of one or more polarization configurations for uplink transmission or downlink reception. Similarly, a base station may have one or more antenna panels capable of one or more polarization configurations for downlink transmission or uplink reception. The base station use a particular polarization, antenna panel, or beam, among other examples for communication with the UE.

In other words, the base station may use a first antenna panel with a first polarization to transmit or receive a first transport block (TB) and may, at a later time, switch to using a second antenna panel with a second polarization to transmit or receive a second TB. Similarly, the UE may use a first antenna panel with a first polarization to receive or transmit the first TB and, at the later time, switch to using a second antenna panel with a second polarization to receive or transmit the second TB.

By aligning to the UE, the base station may improve network performance by reducing a likelihood of, for example, dropped communications. However, when the base station determines to change an antenna configuration (e.g., a base station antenna configuration, which may include a configuration of which polarizations or antenna panels the BS uses), the UE may lack information to use in changing a corresponding antenna configuration (e.g., a UE antenna configuration, which may include a configuration of which polarizations or panels the UE uses).

Similarly, the UE may switch from transmitting or receiving using a first antenna panel with a first polarization to transmitting or receiving using a second antenna panel with a second polarization. In this case, by aligning to the base station, the UE may improve network performance by reducing a likelihood of, for example, dropped communications. However, when the UE determines to change an antenna configuration, the base station may lack information to use in changing a corresponding antenna configuration.

Further, the first antenna panel and the first polarization of the base station and the first antenna panel and the first polarization of the UE may be the same or differently configured antenna panels and polarizations. However, although the base station and the UE may align antenna panels, polarizations, or beams, among other examples to achieve improved communication performance, interruptions in communication may still occur as a result of interference, a presence of other data, or synchronization errors, among other examples.

Some aspects described herein enable polarization and antenna panel configuration. For example, a base station may configure CSI-RS or sounding reference signal (SRS) resources for the UE and the UE may use the CSI-RS resources or the SRS resources to identify an antenna panel configuration to use for communication with the base station. The UE may transmit a report identifying a polarization or antenna panel configuration to the base station. Additionally, or alternatively, the UE may receive information from the base station identifying the antenna panel configuration that the UE is to use for reception of downlink data. In this way, the base station and the UE ensure alignment of respective antenna panel configurations, thereby reducing a likelihood of dropped communications relative to scenarios where the respective antenna panel configurations are not aligned.

Some aspects described herein enable communication diversity configuration for downlink transmission. For example, a base station may provide information identifying a communication diversity configuration to a UE to enable synchronization of respective antenna configurations of the base station and the UE. In this case, the base station may transmit a TB using a plurality of time slots, a plurality of frequency locations, a plurality of polarizations, a plurality of panels, or a plurality of beams, among other examples and the UE may use the communication diversity configuration to enable reception of the TB. For example, the UE may configure a polarization, a panel, or a beam of the UE to correspond to a polarization, a panel, or a beam of the base station and may monitor at a configured time slot or frequency location. In this case, based at least in part on enabling communication diversity using, for example, a plurality of polarizations, panels, or beams, among other examples, the base station and the UE reduce a likelihood of dropped communications relative to scenarios where the respective antenna panel configurations are not aligned and/or communication diversity is not enabled.

Figure 5:
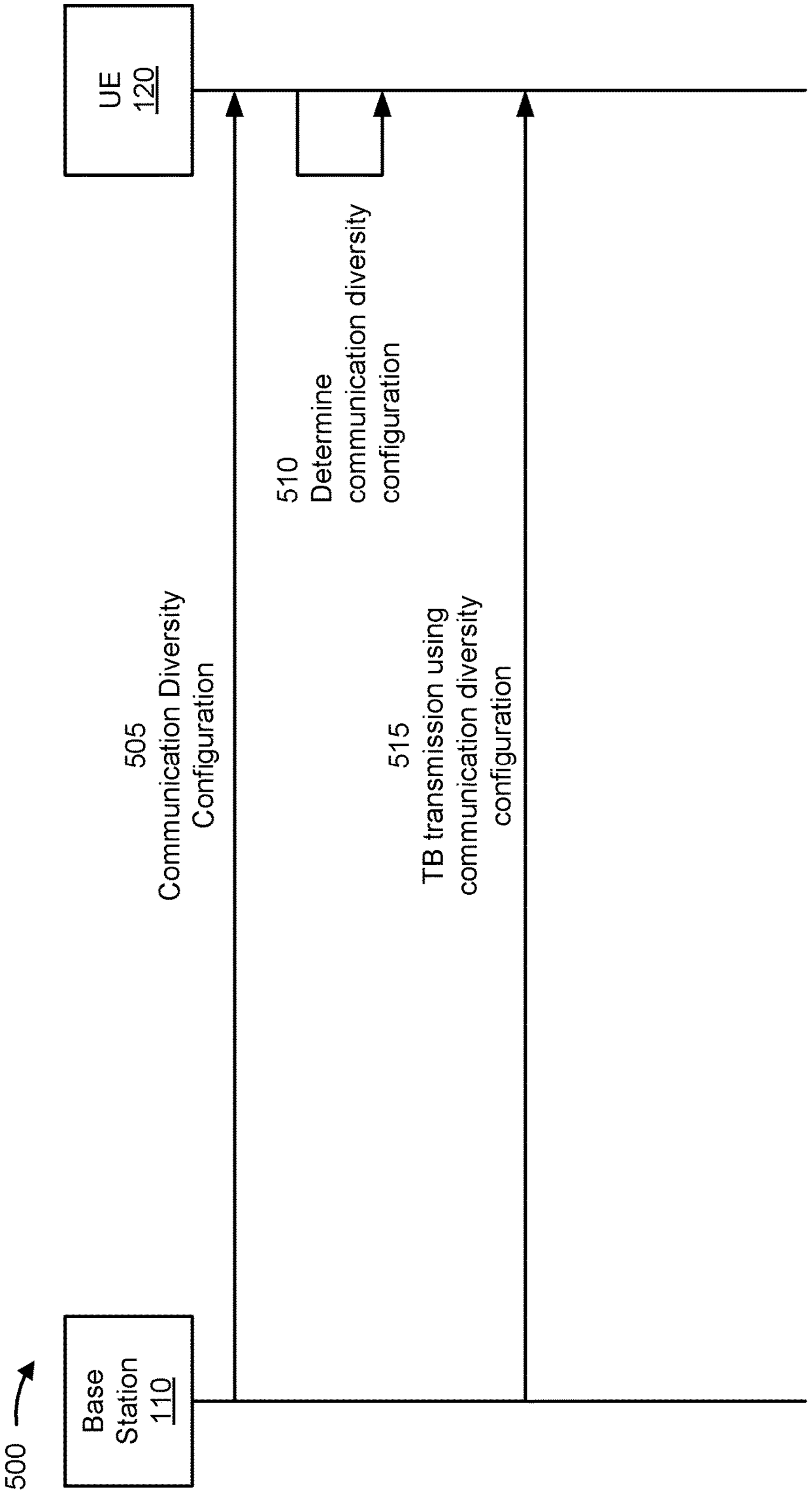
FIG. 5-8 are diagrams illustrating an example associated with polarization and antenna panel configuration and communication diversity configuration, in accordance with the present disclosure.

FIG. 5 is a diagram illustrating an example 500 associated with polarization and antenna panel configuration, in accordance with the present disclosure. As shown in FIG. 5, a base station 110 and a UE 120 may communicate with one another.

As further shown in FIG. 5, and by reference number 505, UE 120 may receive communication diversity configuration information. For example, base station 110 may transmit communication diversity configuration information to identify a configuration with which base station 110 is to transmit a transport block. In some aspects, base station 110 may dynamically transmit information indicating a diversity configuration. For example, base station 110 may transmit dynamic signaling indicating a polarization that UE 120 is to use to receive a transport block and a set of resources that UE 120 is to monitor to receive the transport block.

Additionally, or alternatively, base station 110 may transmit information configuring UE 120 with a pattern or sequence of diversity configurations. For example, base station 110 may transmit information identifying a sequence of polarizations, panels, or beams, among other examples, that UE 120 is to use to receive transport blocks in a sequence of sets of resources. Additionally, or alternatively, base station 110 may transmit information configuring UE 120 with a pseudo-random pattern or sequence of diversity configurations. For example, rather than providing information identifying a non-random pattern of polarizations to use to receive a set of consecutive transport blocks, base station 110 may provide information identifying a random pattern of polarizations to use to receive a set of consecutive transport blocks. In this case, using a random or pseudo-random pattern may randomize or pseudo-randomize interference applied to the transport blocks, thereby reducing a likelihood that a pattern-based interference source (e.g., a periodic transmission) interrupts communication.

In some aspects, base station 110 may determine the communication diversity configuration to indicate to UE 120 based at least in part on a measurement. For example, base station 110 may receive a measurement report of a set of CSI-RS measurements performed by UE 120 and may select the communication diversity configuration based at least in part on the measurement report. Additionally, or alternatively, base station 110 may receive information identifying a UE recommendation of a communication diversity configuration and may confirm the UE recommendation and provide an indication of the confirmation to UE 120. Additionally, or alternatively, base station 110 may perform a set of SRS measurements and may determine the communication diversity configuration based at least in part on the set of SRS measurements.

As further shown in FIG. 5, and by reference numbers 510 and 515, UE 120 may determine the communication diversity configuration and receive one or more transport blocks from base station 110 in accordance with the communication diversity configuration. For example, UE 120 may receive a communication diversity configuration explicitly identifying a set of polarizations, panels, or beams, among other examples, that UE 120 is to use. Additionally, or alternatively, UE 120 may receive information identifying a set of polarizations, panels, or beams that base station 110 is to use for transmission and UE 120 may derive a corresponding set of polarizations, panels, or beams that UE 120 is to use for reception. In this case, based at least in part on determining the communication diversity configuration, UE 120 may receive a transport block in accordance with the communication diversity configuration. For example, base station 110 may transmit a plurality of repetitions of the same transport block using a plurality of time slots, a plurality of frequency locations, a plurality of polarizations, a plurality of panels, a plurality of beams, among other examples, or a combination thereof.

As indicated above, FIG. 5 is provided as an example. Other examples may differ from what is described with respect to FIG. 5.

Figure 6:
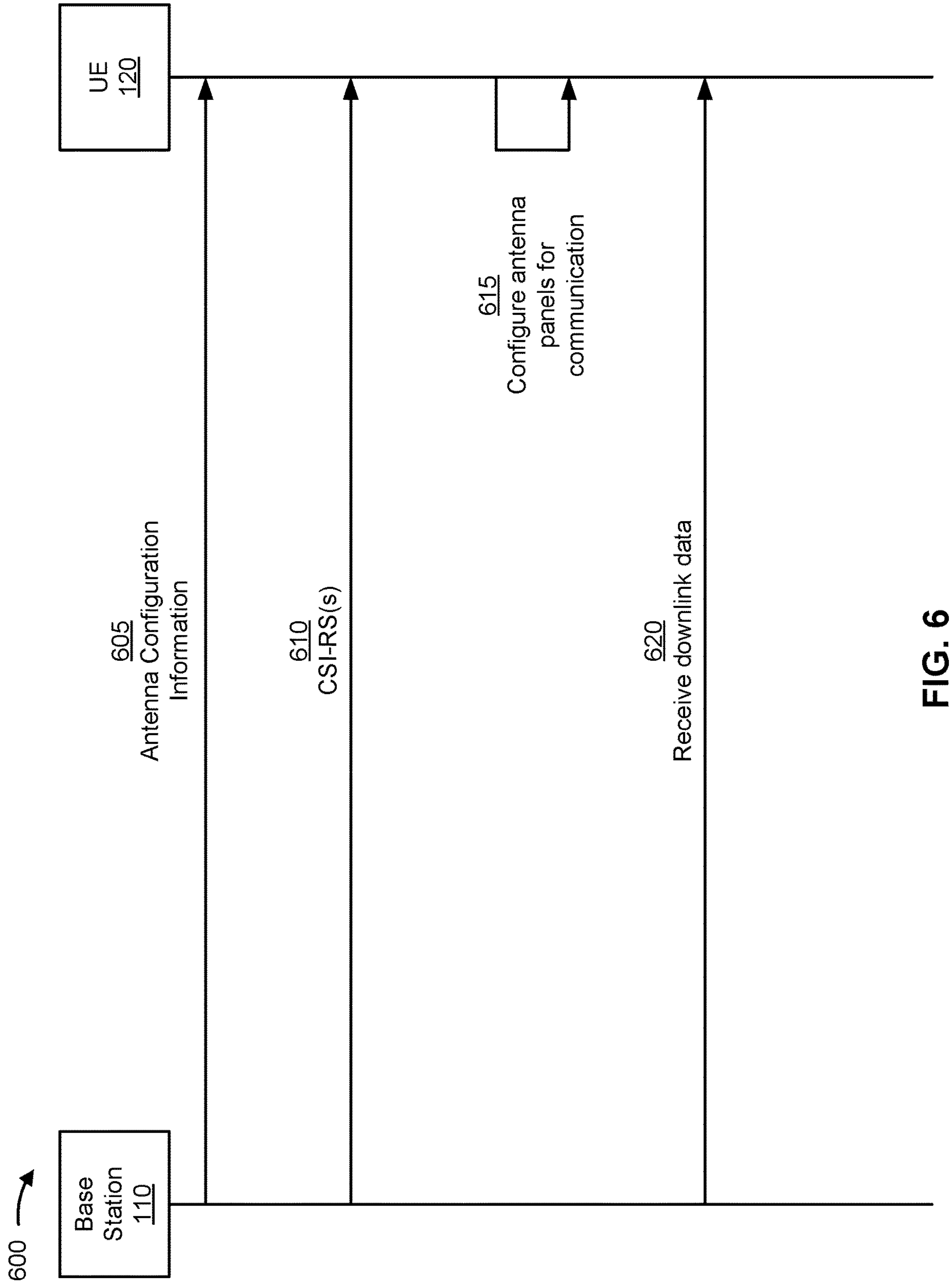

FIG. 6 is a diagram illustrating an example 600 associated with polarization and antenna panel configuration, in accordance with various aspects of the present disclosure. As shown in FIG. 6, a base station 110 and a UE 120 may communicate with one another.

As further shown in FIG. 6, and by reference number 605, UE 120 may receive antenna configuration information. For example, base station 110 may transmit antenna configuration information to enable UE 120 to select an antenna panel, a polarization, or a beam, among other examples. In some aspects, base station 110 may provide antenna configuration information identifying and/or configuring UE 120 with CSI-RS resources. For example, base station 110 may identify a CSI-RS resource timing, a CSI-RS resource frequency, or a CSI-RS resource repetition parameter, among other examples. In this case, base station 110 may provide the information configuring the CSI-RS resources to enable UE 120 to perform a polarization sweeping procedure or a panel sweeping procedure, among other examples, to measure CSI-RSs transmitted on the CSI-RS resources. In some aspects, base station 110 may provide antenna configuration information to configure a measurement report. For example, base station 110 may provide information indicating one or more parameters that UE 120 is to report as a response to measuring the CSI-RSs. In some aspects, base station 110 may include information identifying a P3 measurement, such as a UE polarization, a UE antenna panel, or a UE receive (Rx) beam, among other examples regarding which UE 120 is to provide a measurement report.

As further shown in FIG. 6, and by reference number 610, base station 110 may transmit one or more CSI-RSs. For example, UE 120 may perform a polarization sweeping procedure in which UE 120 attempts to receive the one or more CSI-RSs using one or more polarization configurations (e.g., a horizontal-only polarization configuration, a vertical-only polarization configuration, or a mixed polarization configuration, as described above). Additionally, or alternatively, UE 120 may perform a panel sweeping procedure in which UE 120 attempts to receive the one or more CSI-RSs using one or more antenna panel configurations (e.g., using a first antenna panel, a second antenna panel, or a combination of a first and a second antenna panel, among other examples).

In some aspects, UE 120 may perform a sweeping procedure on a single beam. For example, UE 120 may perform polarization and/or panel sweeping for a single beam that UE 120 is to use for communication with base station 110. Additionally, or alternatively, UE 120 may perform polarization and/or panel sweeping for a plurality of candidate beams that UE 120 may use for communication with base station 110. In this case, UE 120 may select a beam for communication with base station 110 from the plurality of candidate beams based at least in part on a result of performing the polarization and/or panel sweeping procedures. In some aspects, base station 110 may include, in the antenna configuration information, information identifying a configuration for polarization and/or panel sweeping. For example, base station 110 may indicate whether to perform polarization and/or panel sweeping on a single beam or a plurality of beams, a selection of a subset of beams on which to perform polarization and/or panel sweeping, and/or the like.

In some aspects, as shown by reference number 615, UE 120 may configure antenna panels for communication based at least in part on the one or more CSI-RSs. For example, UE 120 may transmit a measurement report as a response to measuring one or more CSI-RSs. For example, UE 120 may transmit a layer 1 (L1) measurement report that includes information identifying a signal to interference and noise ratio or a reference signal received power (RSRP) value, among other examples.

In this case, base station 110 may determine an antenna configuration for base station 110 and may transmit information to UE 120 identifying the antenna configuration for base station 110 (e.g., from which UE 120 may derive a corresponding antenna configuration for UE 120) or explicitly identifying the corresponding antenna configuration for UE 120. For example, base station 110 may identify a pairing between a base station 110 transmit (Tx) polarization and a UE 120 Rx polarization predicted to have a greatest likelihood of communication success. Similarly, base station 110 may identify a pairing between a Tx beam and an Rx beam or a Tx panel and an Rx panel. In this case, base station 110 may transmit a DCI for a dynamic physical downlink shared channel (PDSCH) grant reception scenario or a medium access control (MAC) control element (MAC-CE) for a physical downlink control channel (PDCCH) or semi-persistent scheduling (SPS) scenario to identify an antenna configuration (e.g., an Rx polarization, an Rx beam, or an Rx panel, among other examples). Additionally, or alternatively, base station 110 may configure a delay value. For example, base station 110 may configure a delay between indicating the antenna configuration and when UE 120 is to implement the antenna configuration to account for, for example, a processing delay. In this case, base station 110 may determine the delay based at least in part on a UE capability.

As further shown in FIG. 6, and by reference number 620, UE 120 may receive downlink data from base station 110. For example, based at least in part on determining a UE antenna configuration that corresponds to a BS antenna configuration of base station 110, UE 120 may receive downlink data using one or more selected polarizations, one or more selected antenna panels, or one or more selected beams, among other examples.

As indicated above, FIG. 6 is provided as an example. Other examples may differ from what is described with respect to FIG. 6.

Figure 7:
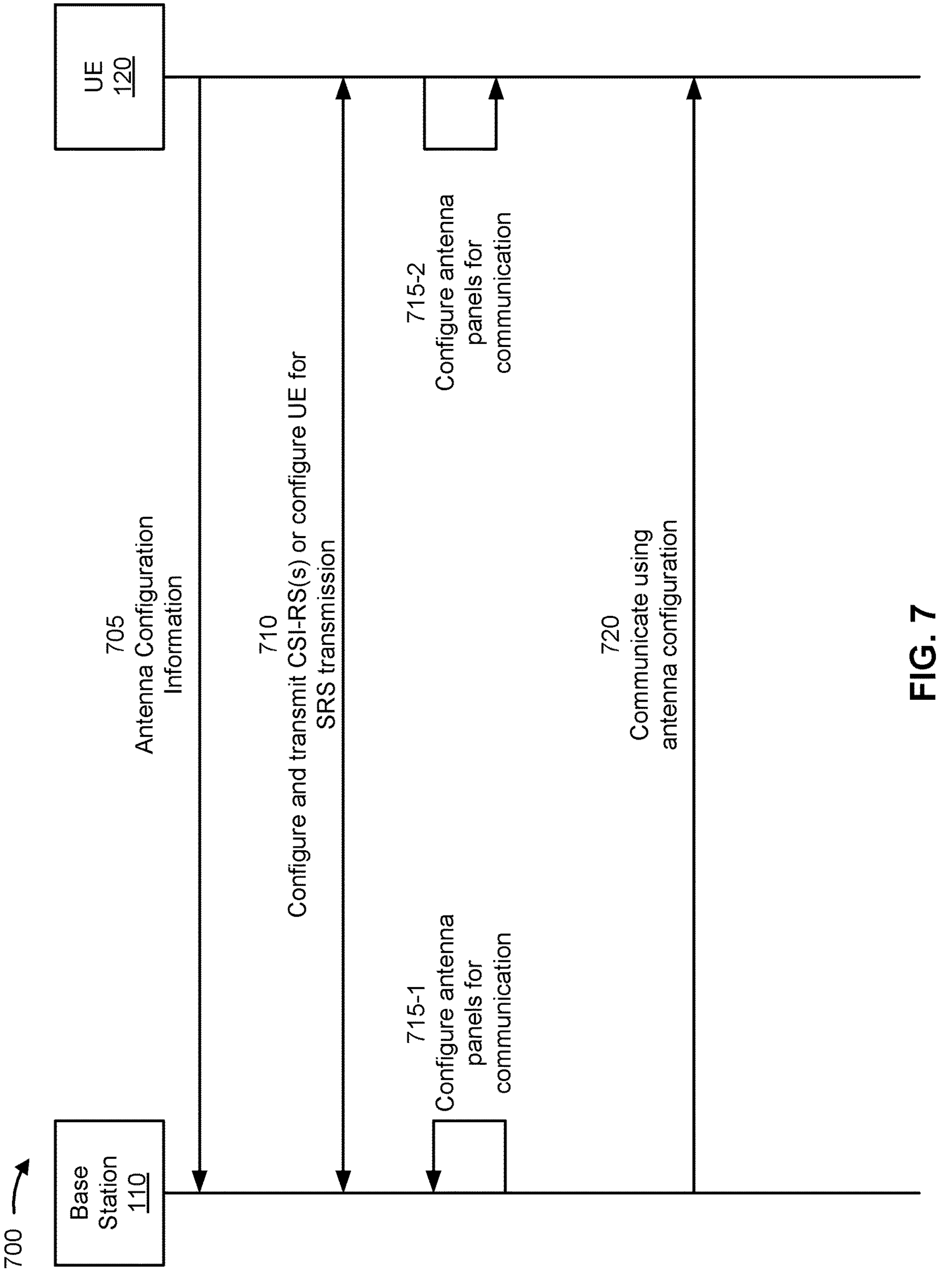

FIG. 7 is a diagram illustrating an example 700 associated with polarization and antenna panel configuration, in accordance with various aspects of the present disclosure. As shown in FIG. 7, a base station 110 and a UE 120 may communicate with one another.

As further shown in FIG. 7, and by reference number 705, UE 120 may transmit antenna configuration information. For example, UE 120 may transmit antenna configuration information to enable base station 110 to select an antenna panel, a polarization, or a beam, among other examples. In some aspects, UE 120 may provide antenna configuration information identifying a parameter of UE 120. For example, UE 120 may provide the antenna configuration information to identify a polarization selection, an antenna panel selection, or a beam selection, among other examples. Additionally, or alternatively, UE 120 may provide the antenna configuration information to identify a change to a parameter of UE 120, such as a change to a polarization selection, a change to an antenna panel selection, or a change to a beam selection, among other examples.

In some aspects, UE 120 may transmit a report including the antenna configuration information based at least in part on base station 110 configuring reporting. For example, base station 110 may transmit configuration information to configure a periodic report, a semi-persistently scheduled report, or an aperiodic report (e.g., base station 110 may transmit a request for a particular report at a particular time), among other examples. Additionally, or alternatively, base station 110 may configure event-based reporting. For example, base station 110 may indicate that UE 120 is to transmit a report including the antenna configuration information when UE 120 changes a polarization selection of an antenna panel of UE 120.

In some aspects, the report may include information identifying a polarization, a panel, or a beam, among other examples for transmission or reception. For example, UE 120 may transmit the report to identify a first polarization that UE 120 is to use for transmission and a second, different polarization that UE 120 is to use for reception. In some aspects, UE 120 may include, in the report or a subsequent measurement report, a measurement (e.g., of a CSI-RS, as described below) and an index (e.g., an index of a polarization, panel, or beam that UE 120 is to use) or an index and no measurement. In some aspects, UE 120 may include, in the report, information identifying a plurality of parameters, such as a first polarization that UE 120 used for a previous communication and a second polarization that UE 120 is to use for a subsequent communication.

As further shown in FIG. 7, and by reference number 710, UE 120 and base station 110 may communicate to align respective antenna panel configurations. For example, base station 110 may transmit a command to trigger UE 120 to perform an SRS sweeping procedure in which UE 120 transmits a set of SRSs with one or more different polarizations, antenna panels, or beams, among other examples. In this case, as shown by reference number 715-1, base station 110 may, for example, align a reception polarization to a UE 120 antenna configuration based at least in part on receiving the set of SRSs.

Additionally, or alternatively, base station 110 may transmit information identifying a set of CSI-RS resources and may transmit a set of CSI-RSs (e.g., with one or more different polarizations, panels, or beams) using the CSI-RS resources. In this case, UE 120 may perform a set of measurements on the set of CSI-RSs based at least in part on the information identifying the CSI-RS resources and/or a measurement configuration thereof. Based at least in part on performing the set of measurements, UE 120 may align an antenna configuration of UE 120 to an antenna configuration of base station 110, as shown by reference number 715-2. Additionally, or alternatively, UE 120 may transmit an L1 measurement report identifying the set of measurements to enable base station 110 to align, for example, a transmit beam or polarization to an antenna configuration of UE 120.

As further shown in FIG. 7, and by reference number 720, UE 120 may communicate with base station 110. For example, based at least in part on aligning respective antenna configurations, base station 110 and UE 120 may communicate on an uplink or a downlink using selected polarizations, antenna panels, or beams, among other examples.

As indicated above, FIG. 7 is provided as an example. Other examples may differ from what is described with respect to FIG. 7.

Figure 8:
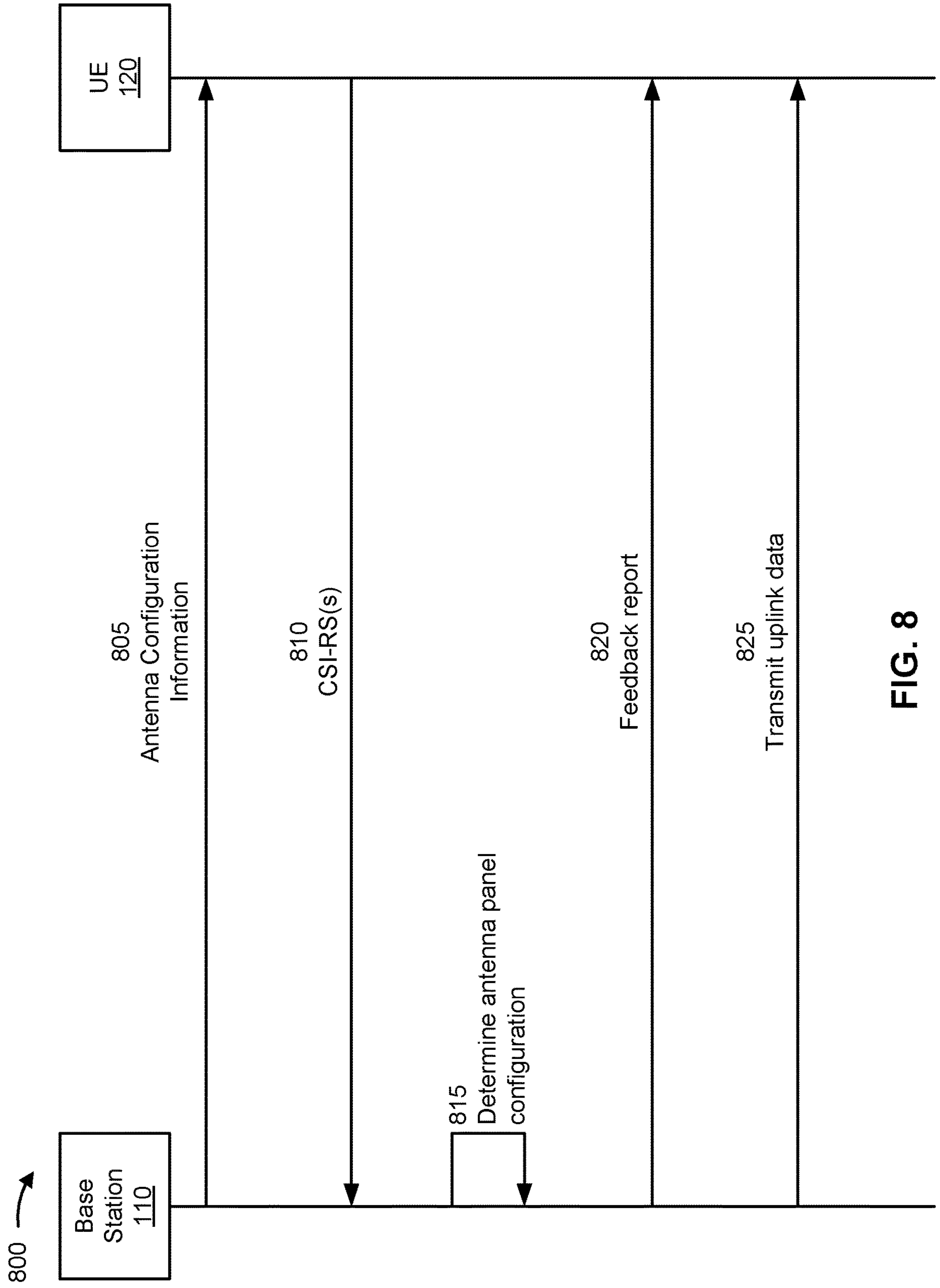

FIG. 8 is a diagram illustrating an example 800 associated with polarization and antenna panel configuration, in accordance with various aspects of the present disclosure. As shown in FIG. 8, a base station 110 and a UE 120 may communicate with one another.

As further shown in FIG. 8, and by reference number 805, UE 120 may receive antenna configuration information. For example, base station 110 may transmit antenna configuration information to enable UE 120 to select an antenna panel, a polarization, or a beam, among other examples. In some aspects, base station 110 may provide antenna configuration information identifying and/or configuring UE 120 with SRS resources. For example, base station 110 may identify an SRS resource timing, an SRS resource frequency, or an SRS resource repetition parameter, among other examples. In this case, base station 110 may provide the information configuring the SRS resources to enable UE 120 to perform a polarization sweeping procedure or a panel sweeping procedure, among other examples, to transmit SRSs on the SRS resources with one or more polarizations, one or more panels, or one or more beams among other examples.

As further shown in FIG. 8, and by reference number 810, UE 120 may transmit one or more SRSs. For example, UE 120 may perform a polarization sweeping procedure in which UE 120 transmits the one or more SRSs using one or more polarization configurations (e.g., a horizontal-only polarization configuration, a vertical-only polarization configuration, or a mixed polarization configuration, as described above). Additionally, or alternatively, UE 120 may perform a panel sweeping procedure in which UE 120 transmits the one or more SRSs using one or more antenna panel configurations (e.g., using a first antenna panel, a second antenna panel, or a combination of a first and a second antenna panel, among other examples). Additionally, or alternatively, UE 120 may perform a beam sweeping procedure in which UE 120 transmits the one or more SRSs using one or more beam configurations (e.g., using a first beam, a second beam, or a combination of a first and a second beam, among other examples). In some aspects, UE 120 may determine a configuration for transmitting SRSs (e.g., which polarizations, antenna panels, or beams to use) based at least in part on the antenna configuration information received from base station 110.

In some aspects, UE 120 may perform a sweeping procedure on a single beam. For example, UE 120 may perform polarization and/or panel sweeping for a single beam that UE 120 is to use for communication with base station 110. Additionally, or alternatively, UE 120 may perform polarization and/or panel sweeping for a plurality of candidate beams that UE 120 may use for communication with base station 110. In this case, UE 120 may select a beam for communication with base station 110 from the plurality of candidate beams based at least in part on a result of performing the polarization and/or panel sweeping procedures.

As further shown in FIG. 8, and by reference number 815, base station 110 may configure antenna panels for communication based at least in part on the one or more SRSs. For example, base station 110 may perform a set of measurements on one or more SRSs and may select a reception polarization for base station 110 (and a corresponding transmit polarization for UE 120) based at least in part on the set of measurements.

As further shown in FIG. 8, and by reference number 820, base station 110 may transmit a feedback report to UE 120. For example, base station 110 may transmit a feedback report identifying the set of measurements or identifying an antenna panel configuration selected based at least in part on the set of measurements, among other examples. In some aspects, UE 120 may receive an L1 measurement report that includes information identifying a signal to interference and noise ratio or an RSRP value, among other examples. In this case, UE 120 may derive a beam, a polarization, or an antenna panel, among other examples, to use for uplink transmission based at least in part on the measurement report.

Additionally, or alternatively, UE 120 may receive a scheduling request indicator (SRI) or a message including an antenna port field configured with a value to indicate a beam, a polarization, or an antenna panel, among other examples, that UE 120 is to use for uplink transmission. For example, UE 120 may receive an indication of a value of an SRI or an antenna port field and may map the value to a configuration of a polarization, panel, or beam to use for uplink transmission. In this case, UE 120 may map the value to the configuration based at least in part on a configured mapping. For example, base station 110 may transmit, via static signaling, information identifying a set of mappings (e.g., a look-up table mapping values to configurations), and may later transmit, using dynamic signaling, information identifying a value that UE 120 is to map using the set of mappings.

In some aspects, base station 110 may configure a delay value. For example, base station 110 may configure a delay between indicating the antenna configuration and when UE 120 is to implement the antenna configuration to account for, for example, a processing delay. In this case, base station 110 may determine the delay based at least in part on a UE capability. For example, base station 110 may determine the delay based at least in part on the UE capability and transmit DCI or a MAC-CE to identify the delay.

As further shown in FIG. 8, and by reference number 825, UE 120 may transmit uplink data to base station 110. For example, based at least in part on determining a UE antenna configuration that corresponds to a BS antenna configuration of base station 110, UE 120 may transmit uplink data using one or more selected polarizations, one or more selected antenna panels, or one or more selected beams, among other examples.

As indicated above, FIG. 8 is provided as an example. Other examples may differ from what is described with respect to FIG. 8.

Figure 9:
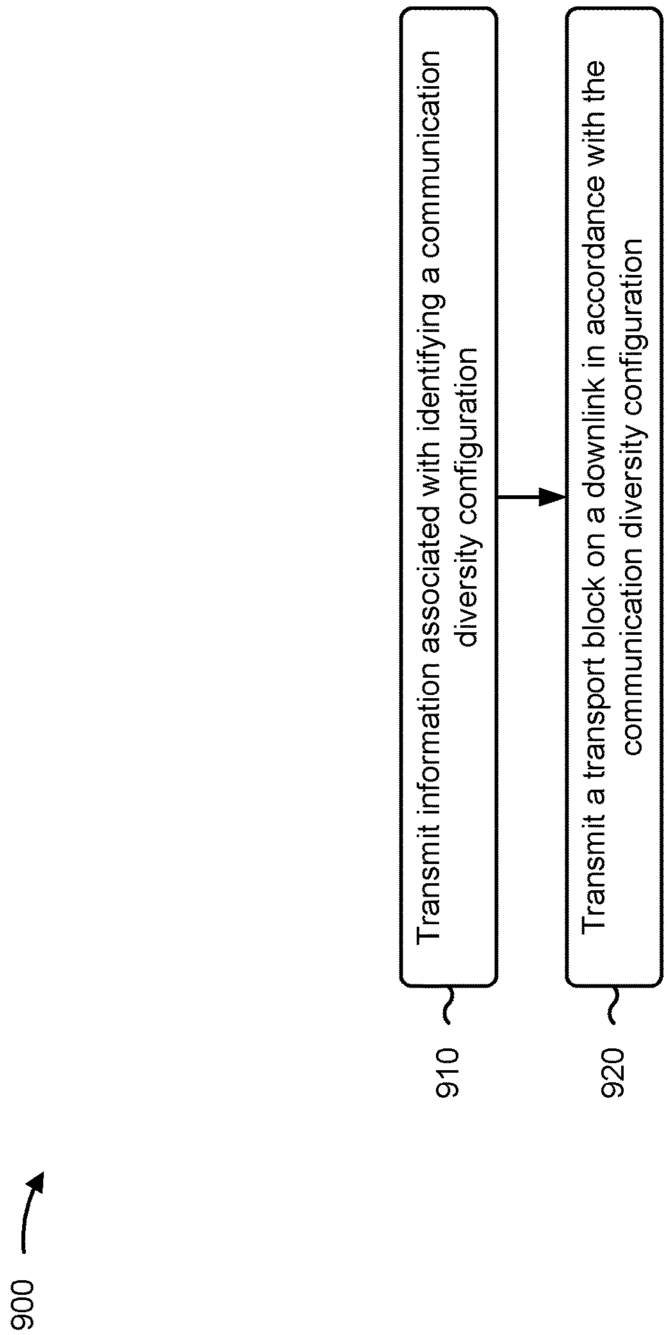
FIGS. 9-16 are diagrams illustrating example processes associated with polarization and antenna panel configuration and communication diversity configuration, in accordance with the present disclosure.

FIG. 9 is a diagram illustrating an example process 900 performed, for example, by a base station, in accordance with the present disclosure. Example process 900 is an example where the base station (e.g., base station 110) performs operations associated with communication diversity configuration for downlink transmission.

As shown in FIG. 9, in some aspects, process 900 may include transmitting information associated with identifying a communication diversity configuration (block 910). For example, the base station (e.g., using transmission component 1804, depicted in FIG. 18) may transmit, to a UE, information associated with identifying a communication diversity configuration, as described above.

As further shown in FIG. 9, in some aspects, process 900 may include transmitting a transport block on a downlink in accordance with the communication diversity configuration (block 920). For example, the base station (e.g., using transmission component 1804, depicted in FIG. 18) may transmit, to the UE, a transport block on a downlink in accordance with the communication diversity configuration, as described above.

Process 900 may include additional aspects, such as any single aspect or any combination of aspects described below and/or in connection with one or more other processes described elsewhere herein.

In a first aspect, transmitting the transport block in accordance with communication diversity configuration comprises transmitting the transport block using at least one of a plurality of time slots, a plurality of frequency locations, a plurality of transmit or receive polarizations, a plurality of transmit or receive panels, or a plurality of transmit or receive beams.

In a second aspect, alone or in combination with the first aspect, transmitting the information associated with identifying the communication diversity configuration comprises transmitting, using dynamic signaling, information identifying a selection of the communication diversity configuration for the UE to use in receiving the transport block.

In a third aspect, alone or in combination with one or more of the first and second aspects, transmitting the information associated with identifying the communication diversity configuration comprises transmitting information identifying a non-random sequence of communication diversity configurations that the UE is to use for receiving a set of transport blocks that includes the transport block.

In a fourth aspect, alone or in combination with one or more of the first through third aspects, transmitting the information associated with identifying the communication diversity configuration comprises transmitting information identifying a pseudo-random sequence of communication diversity configurations that the UE is to use for receiving a set of transport blocks that includes the transport block.

In a fifth aspect, alone or in combination with one or more of the first through fourth aspects, process 900 includes receiving a report associated with identifying one or more measurements, and wherein transmitting the information associated with identifying the communication diversity configuration comprises transmitting the information associated with identifying the communication diversity configuration based at least in part on receiving the report.

In a sixth aspect, alone or in combination with one or more of the first through fifth aspects, process 900 includes receiving a UE request for an identification of the communication diversity configuration, and wherein transmitting the information associated with identifying the communication diversity configuration comprises transmitting the information associated with identifying the communication diversity configuration based at least in part on receiving the UE request.

In a seventh aspect, alone or in combination with one or more of the first through sixth aspects, transmitting the information associated with identifying the communication diversity configuration comprises transmitting the information to identify a base station communication diversity configuration to enable a selection of a corresponding UE communication diversity configuration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
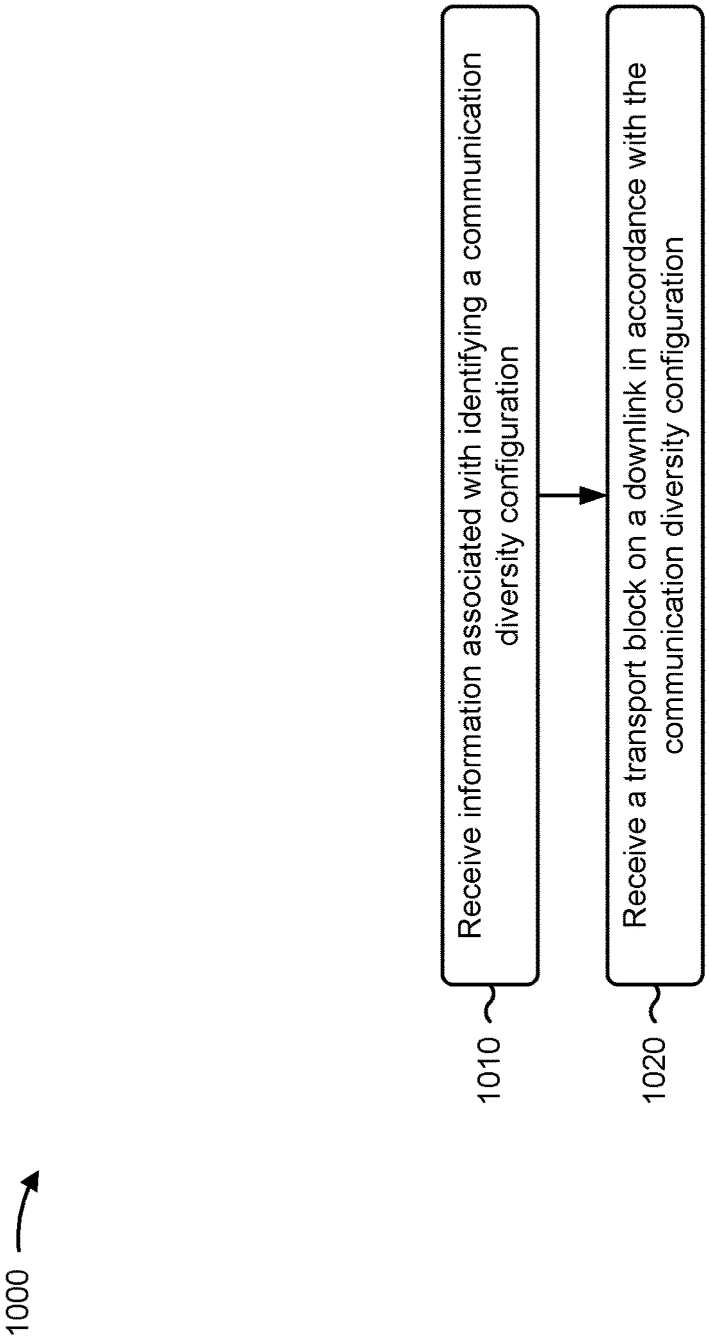

FIG. 10 is a diagram illustrating an example process 1000 performed, for example, by a UE, in accordance with the present disclosure. Example process 1000 is an example where the UE (e.g., UE 120) performs operations associated with communication diversity configuration for downlink transmission.

As shown in FIG. 10, in some aspects, process 1000 may include receiving information associated with identifying a communication diversity configuration (block 1010). For example, the UE (e.g., using reception component 1802, depicted in FIG. 18) may receive, from a base station, information associated with identifying a communication diversity configuration, as described above.

As further shown in FIG. 10, in some aspects, process 1000 may include receiving a transport block on a downlink in accordance with the communication diversity configuration (block 1020). For example, the UE (e.g., using reception component 1802, depicted in FIG. 18) may receive, from the BS, a transport block on a downlink in accordance with the communication diversity configuration, as described above.

Process 1000 may include additional aspects, such as any single aspect or any combination of aspects described below and/or in connection with one or more other processes described elsewhere herein.

In a first aspect, receiving the transport block in accordance with communication diversity configuration comprises receiving the transport block using at least one of a plurality of time slots, a plurality of frequency locations, a plurality of transmit or receive polarizations, a plurality of transmit or receive panels, or a plurality of transmit or receive beams.

In a second aspect, alone or in combination with the first aspect, receiving the information associated with identifying the communication diversity configuration comprises receiving, using dynamic signaling, information identifying a selection of the communication diversity configuration for receiving the transport block.

In a third aspect, alone or in combination with one or more of the first and second aspects, receiving the information associated with identifying the communication diversity configuration comprises receiving information identifying a non-random sequence of communication diversity configurations for receiving a set of transport blocks that includes the transport block.

In a fourth aspect, alone or in combination with one or more of the first through third aspects, receiving the information associated with identifying the communication diversity configuration comprises receiving information identifying a pseudo-random sequence of communication diversity configurations for receiving a set of transport blocks that includes the transport block.

In a fifth aspect, alone or in combination with one or more of the first through fourth aspects, process 1000 includes performing one or more measurements of one or more signals, and transmitting a report associated with identifying the one or more measurements, and wherein receiving the information associated with identifying the communication diversity configuration comprises receiving the information associated with identifying the communication diversity configuration based at least in part on transmitting the report.

In a sixth aspect, alone or in combination with one or more of the first through fifth aspects, process 1000 includes transmitting a request for an identification of the communication diversity configuration, and wherein receiving the information associated with identifying the communication diversity configuration comprises receiving the information associated with identifying the communication diversity configuration based at least in part on transmitting the request.

In a seventh aspect, alone or in combination with one or more of the first through sixth aspects, receiving the information associated with identifying the communication diversity configuration comprises receiving information identifying a base station communication diversity configuration, and selecting a corresponding UE communication diversity configuration to use for receiving the transport block.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
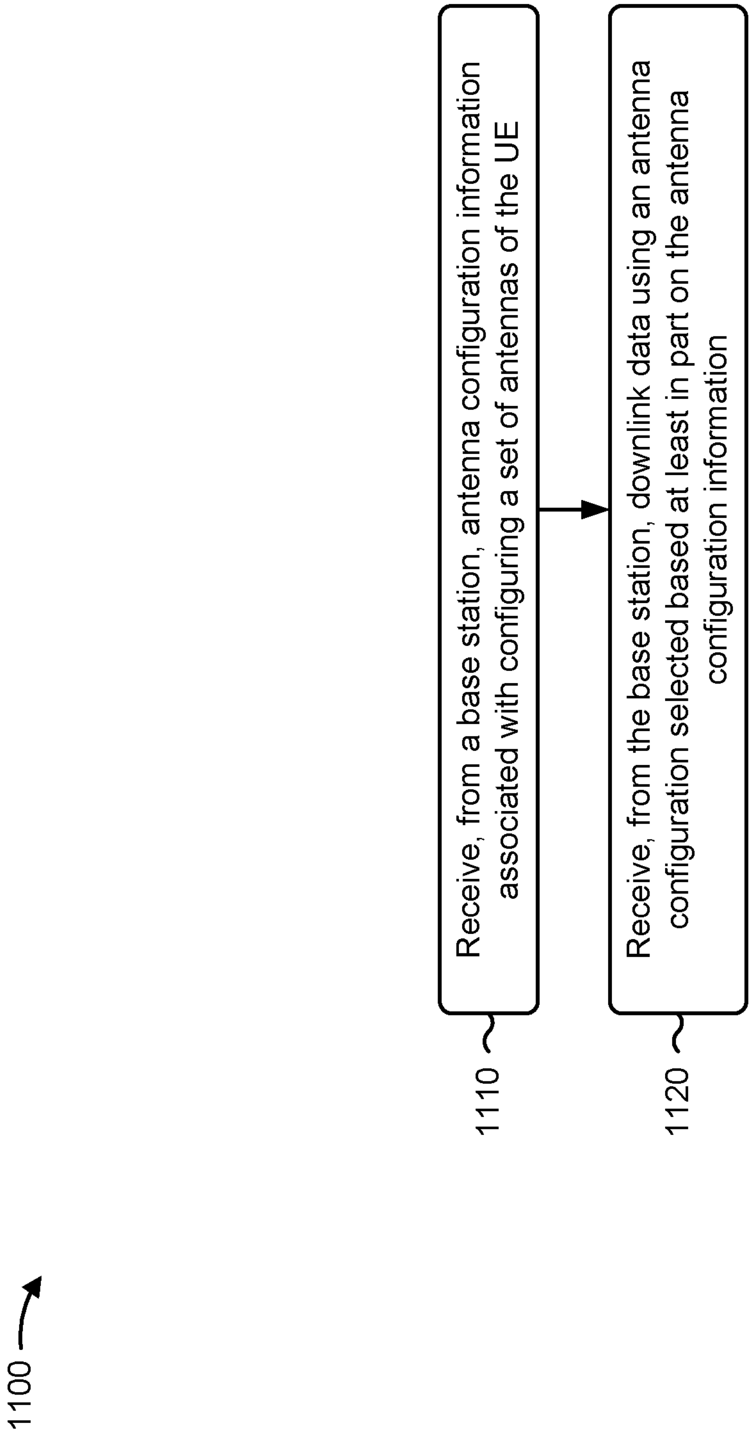

FIG. 11 is a diagram illustrating an example process 1100 performed, for example, by a UE, in accordance with various aspects of the present disclosure. Example process 1100 is an example where the UE (e.g., UE 120) performs operations associated with polarization and antenna panel configuration.

As shown in FIG. 11, in some aspects, process 1100 may include receiving, from a base station, antenna configuration information associated with configuring a set of antennas of the UE (block 1110). For example, the UE (e.g., using reception component 1802, depicted in FIG. 18) may receive, from a base station, antenna configuration information associated with configuring a set of antennas of the UE, as described above.

As further shown in FIG. 11, in some aspects, process 1100 may include receiving, from the base station, downlink data using an antenna configuration selected based at least in part on the antenna configuration information (block 1120). For example, the UE (e.g., using reception component 1802, depicted in FIG. 18) may receive, from the base station, downlink data using an antenna configuration selected based at least in part on the antenna configuration information, as described above.

Process 1100 may include additional aspects, such as any single aspect or any combination of aspects described below and/or in connection with one or more other processes described elsewhere herein.

In a first aspect, process 1100 includes configuring at least one of a panel selection or a polarization selection based at least in part on the antenna configuration information.

In a second aspect, alone or in combination with the first aspect, the antenna configuration information includes information identifying a set of channel state information reference signal resources, and process 1100 further comprises performing at least one of polarization sweeping or panel sweeping to perform a set of measurements using the set of channel state information reference signal resources, and selecting the antenna configuration based at least in part on the set of measurements.

In a third aspect, alone or in combination with one or more of the first and second aspects, the antenna configuration information includes information identifying a set of channel state information reference signal resources, and process 1100 further comprises performing a set of measurements using the set of channel state information reference signal resources, and transmitting a layer 1 measurement report identifying the set of measurements.

In a fourth aspect, alone or in combination with one or more of the first through third aspects, the set of measurements is associated with a set of possible polarization selections or panel selections of the UE, and the set of measurements includes at least one of a signal to interference and noise ratio measurement, or a reference signal received power measurement.

In a fifth aspect, alone or in combination with one or more of the first through fourth aspects, the antenna configuration information includes information identifying a measurement configuration for a set of channel state information reference signal measurements, and the measurement configuration includes information indicating that the UE is to perform at least one of a set of polarization sweeping measurements for a single beam, a set of panel sweeping measurements for the single beam, a set of polarization sweeping measurements for a plurality of beams, or a set of panel sweeping measurements for the plurality of beams.

In a sixth aspect, alone or in combination with one or more of the first through fifth aspects, the antenna configuration information includes information identifying a report configuration for measurement reporting, and the report configuration includes information indicating that measurement reporting is to include at least one of a polarization report, a panel report, or a receive beam report.

In a seventh aspect, alone or in combination with one or more of the first through sixth aspects, process 1100 includes transmitting, to the base station, a measurement report including one or more measurements performed based at least in part on the antenna configuration information, and receiving, from the base station, selection information identifying at least one of a polarization selection, or a panel selection.

In an eighth aspect, alone or in combination with one or more of the first through seventh aspects, the selection information is received using at least one of a downlink control information, or a medium access control control element.

In a ninth aspect, alone or in combination with one or more of the first through eighth aspects, the antenna configuration information includes information identifying a delay configuration, wherein the delay configuration is for receiving at least one of a polarization selection or a panel selection.

In a tenth aspect, alone or in combination with one or more of the first through ninth aspects, the delay configuration is based at least in part on a UE capability.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:

FIG. 12 is a diagram illustrating an example process 1200 performed, for example, by a base station, in accordance with various aspects of the present disclosure. Example process 1200 is an example where the base station (e.g., base station 110) performs operations associated with polarization and antenna panel configuration.

As shown in FIG. 12, in some aspects, process 1200 may include transmitting, to a UE, antenna configuration information associated with configuring a set of antennas of the UE (block 1210). For example, the base station (e.g., using transmission component 1704, depicted in FIG. 17) may transmit, to a UE, antenna configuration information associated with configuring a set of antennas of the UE, as described above.

As further shown in FIG. 12, in some aspects, process 1200 may include transmitting, to the UE, downlink data using a base station antenna configuration corresponding to a UE antenna configuration selected based at least in part on the antenna configuration information (block 1220). For example, the base station (e.g., using transmission component 1704, depicted in FIG. 17) may transmit, to the UE, downlink data using a base station antenna configuration corresponding to a UE antenna configuration selected based at least in part on the antenna configuration information, as described above.

Process 1200 may include additional aspects, such as any single aspect or any combination of aspects described below and/or in connection with one or more other processes described elsewhere herein.

In a first aspect, process 1200 includes transmitting the antenna configuration information to configure at least one of a panel selection or a polarization selection.

In a second aspect, alone or in combination with the first aspect, the antenna configuration information includes information identifying a set of channel state information reference signal resources, and process 1200 further comprises receiving a layer 1 measurement report identifying a set of measurements or the set of channel state information reference signal resources.

In a third aspect, alone or in combination with one or more of the first and second aspects, the set of measurements is associated with a set of possible polarization selections or panel selections of the UE, and the set of measurements includes at least one of a signal to interference and noise ratio measurement, or a reference signal received power measurement.

In a fourth aspect, alone or in combination with one or more of the first through third aspects, the antenna configuration information includes information identifying a measurement configuration for a set of channel state information reference signal measurements, and the measurement configuration includes information indicating that the UE is to perform at least one of a set of polarization sweeping measurements for a single beam, a set of panel sweeping measurements for the single beam, a set of polarization sweeping measurements for a plurality of beams, or a set of panel sweeping measurements for the plurality of beams.

In a fifth aspect, alone or in combination with one or more of the first through fourth aspects, the antenna configuration information includes information identifying a report configuration for measurement reporting, and the report configuration includes information indicating that measurement reporting is to include at least one of a polarization report, a panel report, or a receive beam report.

In a sixth aspect, alone or in combination with one or more of the first through fifth aspects, process 1200 includes receiving, from the UE, a measurement report including one or more measurements performed based at least in part on the antenna configuration information, and transmitting, to the UE, selection information identifying at least one of a polarization selection, or a panel selection.

In a seventh aspect, alone or in combination with one or more of the first through sixth aspects, the selection information is transmitted using at least one of a downlink control information, or a medium access control control element.

In an eighth aspect, alone or in combination with one or more of the first through seventh aspects, the antenna configuration information includes information identifying a delay configuration, wherein the delay configuration is for the UE to receive at least one of a polarization selection or a panel selection.

In a ninth aspect, alone or in combination with one or more of the first through eighth aspects, the delay configuration is based at least in part on a UE capability.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
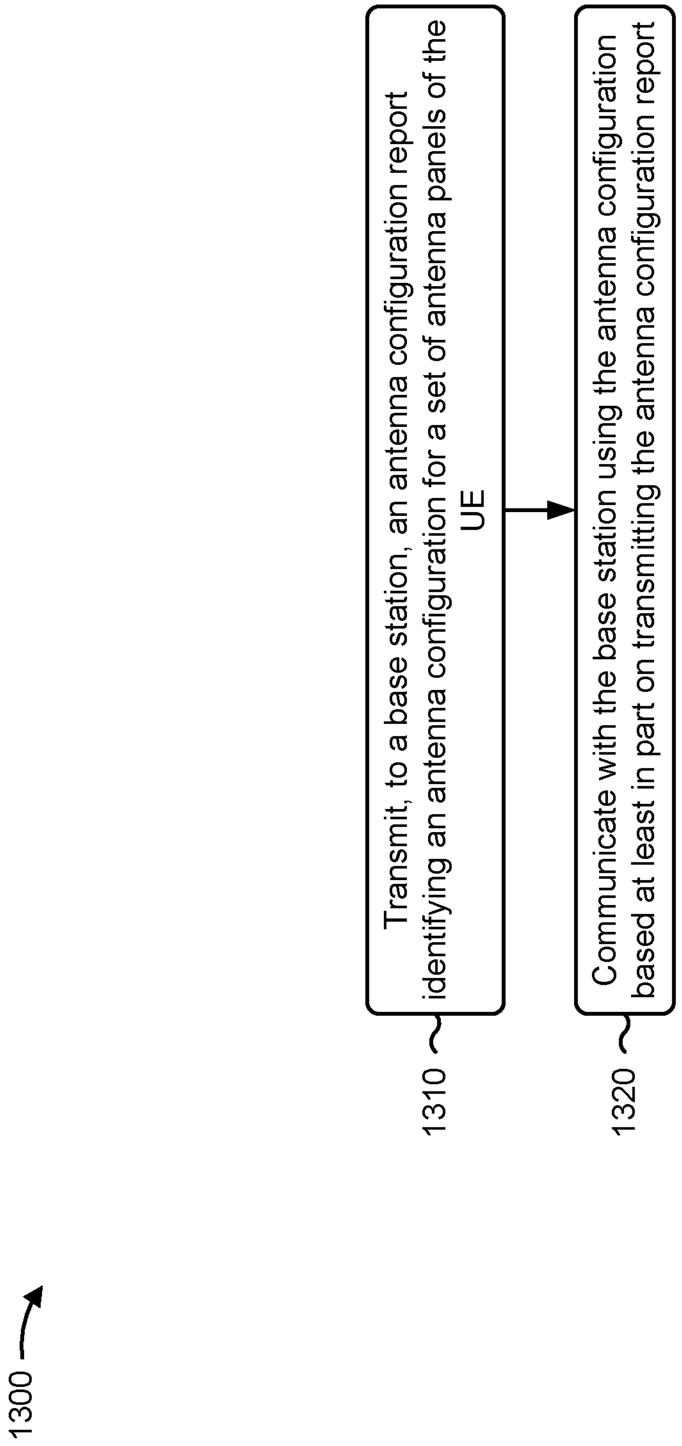

FIG. 13 is a diagram illustrating an example process 1300 performed, for example, by a UE, in accordance with various aspects of the present disclosure. Example process 1300 is an example where the UE (e.g., UE 120) performs operations associated with polarization and antenna panel configuration reporting.

As shown in FIG. 13, in some aspects, process 1300 may include transmitting, to a base station, an antenna configuration report identifying an antenna configuration for a set of antenna panels of the UE (block 1310). For example, the UE (e.g., using transmission component 1804, depicted in FIG. 18) may transmit, to a base station, an antenna configuration report identifying an antenna configuration for a set of antenna panels of the UE, as described above.

As further shown in FIG. 13, in some aspects, process 1300 may include communicating with the base station using the antenna configuration based at least in part on transmitting the antenna configuration report (block 1320). For example, the UE (e.g., using reception component 1802 or transmission component 1804, depicted in FIG. 18) may communicate with the base station using the antenna configuration based at least in part on transmitting the antenna configuration report, as described above.

Process 1300 may include additional aspects, such as any single aspect or any combination of aspects described below and/or in connection with one or more other processes described elsewhere herein.

In a first aspect, the antenna configuration report includes information identifying at least one of a polarization selection, an antenna panel selection, or a beam selection.

In a second aspect, alone or in combination with the first aspect, the antenna configuration report is a periodic report.

In a third aspect, alone or in combination with one or more of the first and second aspects, process 1300 includes receiving a request to transmit the antenna configuration report, and wherein transmitting the antenna configuration report comprises transmitting the antenna configuration report aperiodically as a response to the request.

In a fourth aspect, alone or in combination with one or more of the first through third aspects, process 1300 includes determining to change the antenna configuration, and wherein transmitting the antenna configuration report comprises transmitting the antenna configuration report using a set of pre-configured resources based at least in part on determining to change the antenna configuration.

In a fifth aspect, alone or in combination with one or more of the first through fourth aspects, process 1300 includes receiving a command to perform a sounding reference signal sweep based at least in part on transmitting the antenna configuration report, and aligning to a polarization of the base station based at least in part on the sounding reference signal sweep.

In a sixth aspect, alone or in combination with one or more of the first through fifth aspects, process 1300 includes receiving an indication of a set of channel state information reference signal resources based at least in part on transmitting the antenna configuration report, performing one or more measurements of the set of channel state information reference signal resources using the antenna configuration, and transmitting a report of the one or more measurements.

In a seventh aspect, alone or in combination with one or more of the first through sixth aspects, the antenna configuration report includes information identifying at least one of a transmit beam and a reception beam that is different from the transmit beam, a transmit antenna panel and a reception antenna panel that is different from the transmit antenna panel, or a transmit polarization and a reception polarization that is different from the transmit polarization.

In an eighth aspect, alone or in combination with one or more of the first through seventh aspects, the antenna configuration report includes information identifying an index of at least one of one or more polarizations, one or more antenna panels, or one or more beams or the index and a measurement of the at least one of the one or more polarizations, the one or more antenna panels, or the one or more beams.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
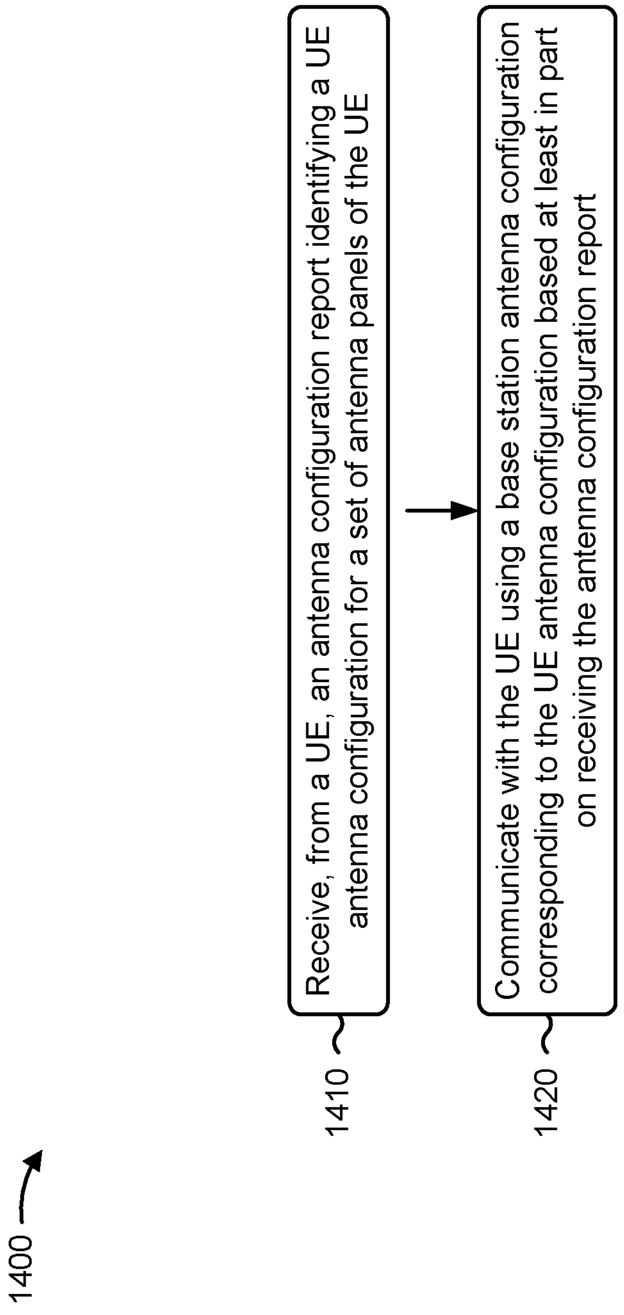

FIG. 14 is a diagram illustrating an example process 1400 performed, for example, by a base station, in accordance with various aspects of the present disclosure. Example process 1400 is an example where the base station (e.g., base station 110) performs operations associated with polarization and antenna panel configuration reporting.

As shown in FIG. 14, in some aspects, process 1400 may include receiving, from a UE, an antenna configuration report identifying a UE antenna configuration for a set of antenna panels of the UE (block 1410). For example, the base station (e.g., using reception component 1702, depicted in FIG. 17) may receive, from a UE, an antenna configuration report identifying a UE antenna configuration for a set of antenna panels of the UE, as described above.

As further shown in FIG. 14, in some aspects, process 1400 may include communicating with the UE using a base station antenna configuration corresponding to the UE antenna configuration based at least in part on receiving the antenna configuration report (block 1420). For example, the base station (e.g., using reception component 1702 or transmission component 1704, depicted in FIG. 17) may communicate with the UE using a base station antenna configuration corresponding to the UE antenna configuration based at least in part on receiving the antenna configuration report, as described above.

Process 1400 may include additional aspects, such as any single aspect or any combination of aspects described below and/or in connection with one or more other processes described elsewhere herein.

In a first aspect, the antenna configuration report includes information identifying at least one of a polarization selection, an antenna panel selection, or a beam selection.

In a second aspect, alone or in combination with the first aspect, the antenna configuration report is a periodic report.

In a third aspect, alone or in combination with one or more of the first and second aspects, process 1400 includes transmitting a request for the UE to transmit the antenna configuration report, and wherein receiving the antenna configuration report comprises receiving the antenna configuration report aperiodically as a response to the request.

In a fourth aspect, alone or in combination with one or more of the first through third aspects, receiving the antenna configuration report comprises receiving the antenna configuration report using a set of pre-configured resources based at least in part on a UE determination to change the UE antenna configuration.

In a fifth aspect, alone or in combination with one or more of the first through fourth aspects, process 1400 includes transmitting a command to perform a sounding reference signal sweep based at least in part on receiving the antenna configuration report and to align the UE to a polarization of the base station.

In a sixth aspect, alone or in combination with one or more of the first through fifth aspects, process 1400 includes transmitting an indication of a set of channel state information reference signal resources based at least in part on receiving the antenna configuration report, and receiving a report of one or more measurements of the set of channel state information reference signal resources.

In a seventh aspect, alone or in combination with one or more of the first through sixth aspects, the antenna configuration report includes information identifying at least one of a transmit beam and a reception beam that is different from the transmit beam, a transmit antenna panel and a reception antenna panel that is different from the transmit antenna panel, or a transmit polarization and a reception polarization that is different from the transmit polarization.

In an eighth aspect, alone or in combination with one or more of the first through seventh aspects, the antenna configuration report includes information identifying an index of at least one of one or more polarizations, one or more antenna panels, or one or more beams or the index and a measurement of the at least one of the one or more polarizations, the one or more antenna panels, or the one or more beams.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
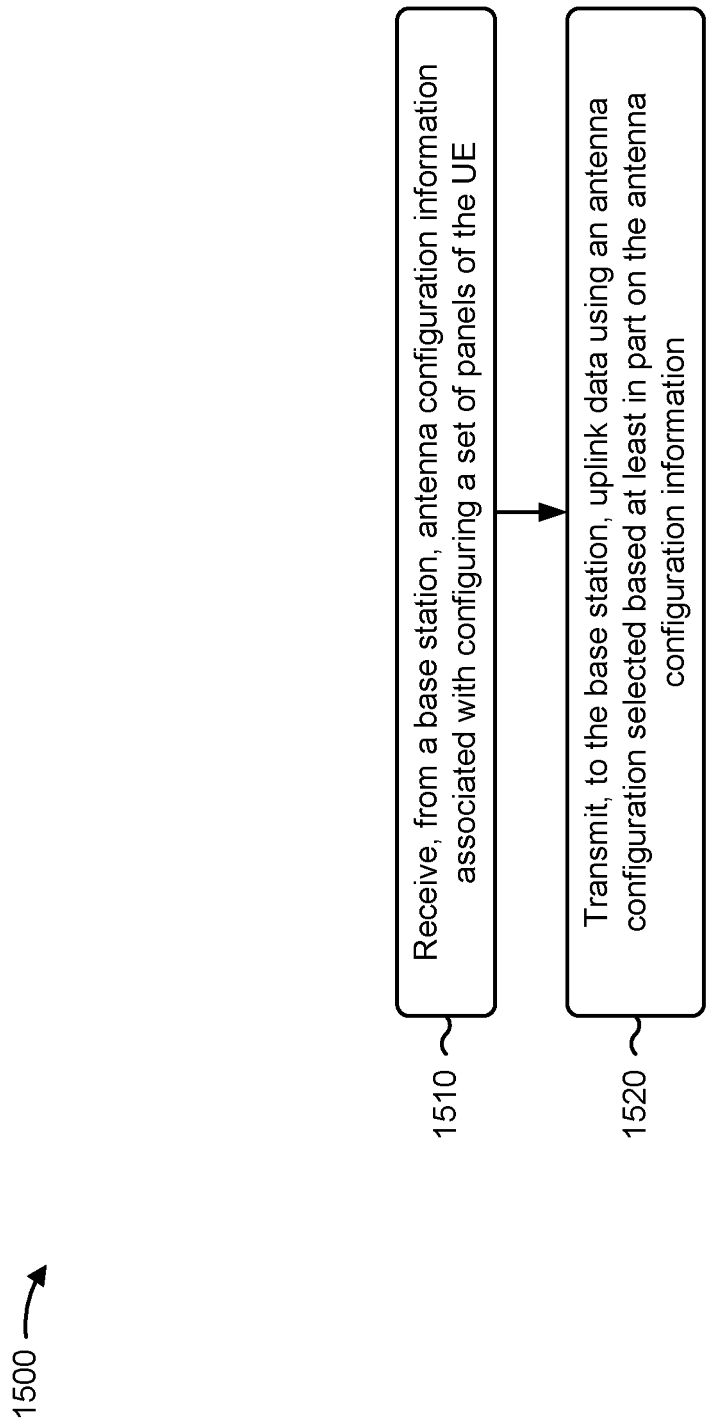

FIG. 15 is a diagram illustrating an example process 1500 performed, for example, by a UE, in accordance with various aspects of the present disclosure. Example process 1500 is an example where the UE (e.g., UE 120) performs operations associated with polarization and antenna panel configuration for uplink transmission.

As shown in FIG. 15, in some aspects, process 1500 may include receiving, from a base station, antenna configuration information associated with configuring a set of panels of the UE (block 1510). For example, the UE (e.g., using reception component 1802, depicted in FIG. 18) may receive, from a base station, antenna configuration information associated with configuring a set of panels of the UE, as described above.

As further shown in FIG. 15, in some aspects, process 1500 may include transmitting, to the base station, uplink data using an antenna configuration selected based at least in part on the antenna configuration information (block 1520). For example, the UE (e.g., using transmission component 1804, depicted in FIG. 18) may transmit, to the base station, uplink data using an antenna configuration selected based at least in part on the antenna configuration information, as described above.

Process 1500 may include additional aspects, such as any single aspect or any combination of aspects described below and/or in connection with one or more other processes described elsewhere herein.

In a first aspect, process 1500 includes configuring at least one of a panel selection or a polarization selection based at least in part on the antenna configuration information.

In a second aspect, alone or in combination with the first aspect, the antenna configuration information includes information identifying a set of sounding reference signal resources, and further comprising performing, using the set of sounding reference signal resources, at least one of polarization sweeping or panel sweeping to enable a set of measurements, receiving, from the base station, a feedback report generated based at least in part on the set of measurements, and selecting the antenna configuration based at least in part on feedback report.

In a third aspect, alone or in combination with one or more of the first and second aspects, the set of sounding reference signal resources is a set of periodic resources or aperiodic resources.

In a fourth aspect, alone or in combination with one or more of the first through third aspects, the antenna configuration information includes information identifying a sounding reference signal sweeping configuration, and wherein the sounding reference signal sweeping configuration indicates that the UE is to perform at least one of sweeping for a single beam, paneling sweeping for a single beam, sweeping for a plurality of beams, or paneling sweeping for a plurality of beams.

In a fifth aspect, alone or in combination with one or more of the first through fourth aspects, receiving antenna configuration information comprises receiving an indication the antenna configuration derived based at least in part on a set of sounding reference signal measurements.

In a sixth aspect, alone or in combination with one or more of the first through fifth aspects, the indication includes a sounding reference signal resource indicator or antenna port indicator identifying, for the uplink data, a transmission parameter, wherein the transmission parameter is at least one of a beam, a panel, or a polarization.

In a seventh aspect, alone or in combination with one or more of the first through sixth aspects, process 1500 includes determining the transmission parameter based at least in part on a mapping between a first value for the transmission parameter and a second value for the sounding reference signal resource indicator or the antenna port indicator.

In an eighth aspect, alone or in combination with one or more of the first through seventh aspects, the antenna configuration information includes information identifying a delay configuration, wherein the delay configuration is for receiving at least one of a polarization selection or a panel selection and is based at least in part on a UE capability.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
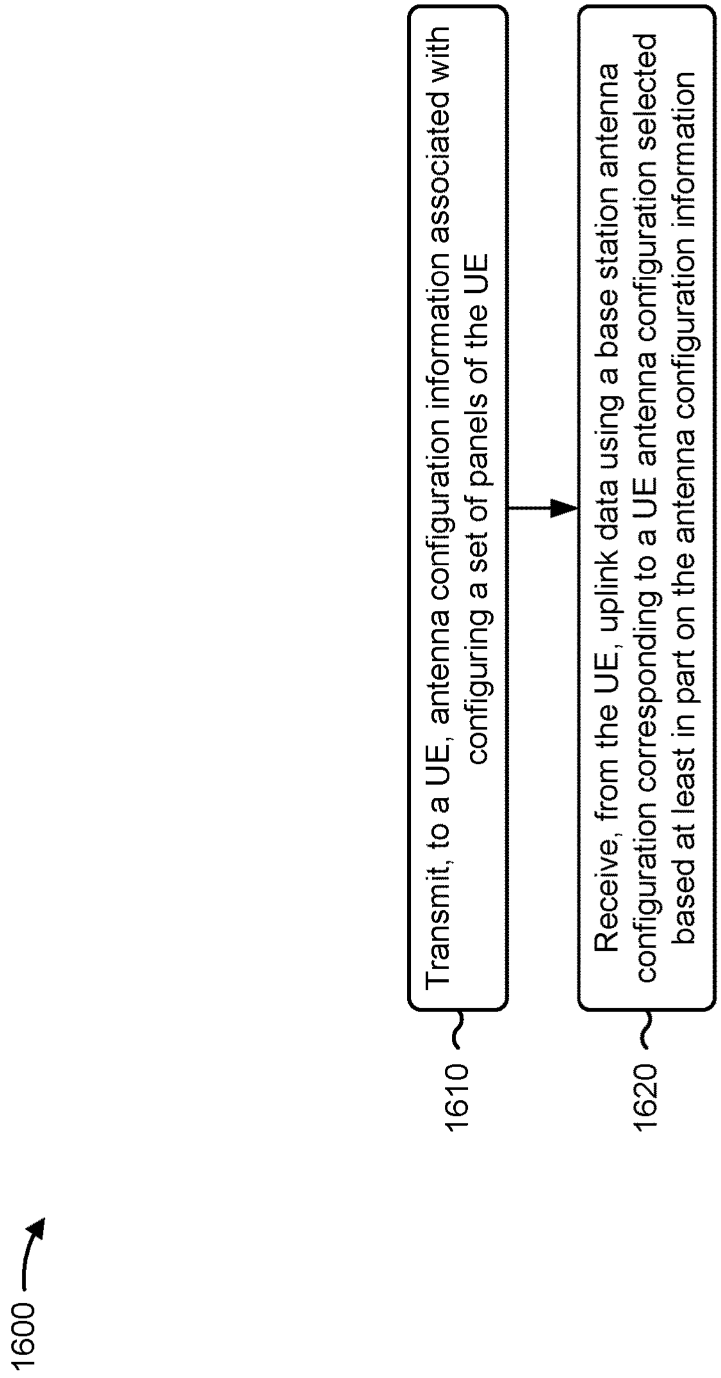

FIG. 16 is a diagram illustrating an example process 1600 performed, for example, by a base station, in accordance with various aspects of the present disclosure. Example process 1600 is an example where the base station (e.g., base station 110) performs operations associated with polarization and antenna panel configuration for uplink transmission.

As shown in FIG. 16, in some aspects, process 1600 may include transmitting, to a UE, antenna configuration information associated with configuring a set of panels of the UE (block 1610). For example, the base station (e.g., using transmission component 1704, depicted in FIG. 17) may transmit, to a UE, antenna configuration information associated with configuring a set of panels of the UE, as described above.

As further shown in FIG. 16, in some aspects, process 1600 may include receiving, from the UE, uplink data using a base station antenna configuration corresponding to a UE antenna configuration selected based at least in part on the antenna configuration information (block 1620). For example, the base station (e.g., using reception component 1702, depicted in FIG. 17) may receive, from the UE, uplink data using a base station antenna configuration corresponding to a UE antenna configuration selected based at least in part on the antenna configuration information, as described above.

Process 1600 may include additional aspects, such as any single aspect or any combination of aspects described below and/or in connection with one or more other processes described elsewhere herein.

In a first aspect, process 1600 includes transmitting the antenna configuration information to configure at least one of a panel selection or a polarization selection.

In a second aspect, alone or in combination with the first aspect, the antenna configuration information includes information identifying a set of sounding reference signal resources, and further comprising performing a set of measurements on polarization sweeping or panel sweeping transmissions using the set of sounding reference signal resources, and transmitting, to the UE, a feedback report, identifying the UE antenna configuration, generated based at least in part on the set of measurements.

In a third aspect, alone or in combination with one or more of the first and second aspects, the set of sounding reference signal resources is a set of periodic resources or aperiodic resources.

In a fourth aspect, alone or in combination with one or more of the first through third aspects, the antenna configuration information includes information identifying a sounding reference signal sweeping configuration, and wherein the sounding reference signal sweeping configuration indicates that the UE is to perform at least one of sweeping for a single beam, paneling sweeping for a single beam, sweeping for a plurality of beams, or paneling sweeping for a plurality of beams.

In a fifth aspect, alone or in combination with one or more of the first through fourth aspects, transmitting the antenna configuration information comprises transmitting an indication that includes a sounding reference signal resource indicator or an antenna port indicator identifying, for the uplink data, a transmission parameter, wherein the transmission parameter is at least one of a beam, a panel, or a polarization.

In a sixth aspect, alone or in combination with one or more of the first through fifth aspects, process 1600 includes providing information identifying a mapping between a first value for the transmission parameter and a second value for the sounding reference signal resource indicator or the antenna port indicator to enable the UE to determine the transmission parameter.

In a seventh aspect, alone or in combination with one or more of the first through sixth aspects, the antenna configuration information includes information identifying a delay configuration, wherein the delay configuration is for transmitting at least one of a polarization selection or a panel selection and is based at least in part on a UE capability.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
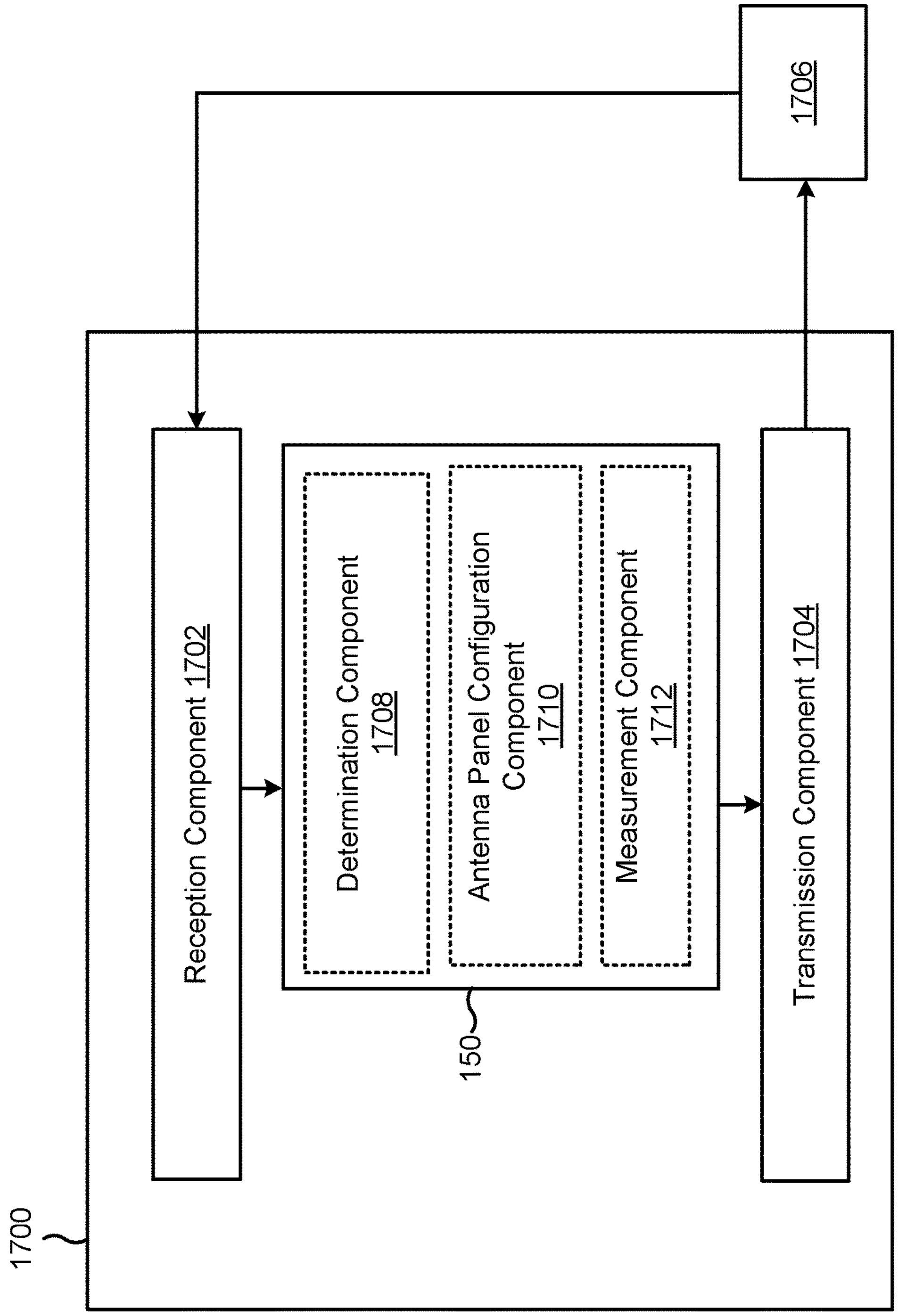
FIGS. 17-18 are block diagrams of example apparatuses for wireless communication, in accordance with the present disclosure.

FIG. 17 is a block diagram of an example apparatus 1700 for wireless communication. The apparatus 1700 may be a base station, or a base station may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include one or more of a determination component 1708, an antenna panel configuration component 1710, or a measurement component 1712, among other examples.

In some aspects, the apparatus 1700 may be configured to perform one or more operations described herein in connection with FIGS. 5-8. Additionally, or alternatively, the apparatus 1700 may be configured to perform one or more processes described herein, such as process 900 of FIG. 9, process 1200 of FIG. 12, process 1400 of FIG. 14, or process 1600 of FIG. 16, among other examples. In some aspects, the apparatus 1700 and/or one or more components shown in FIG. 17 may include one or more components of the base station described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a demodulator, a MIMO detector, a receive processor, a controller/processor, a memory, or a combination thereof, of the base station described above in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the base station described above in connection with FIG. 2. In some aspects, the transmission component 1704 may be collocated with the reception component 1702 in a transceiver.

The transmission component 1704 may transmit, to the apparatus 1706, information associated with identifying a communication diversity configuration. The transmission component 1704 may transmit, to the apparatus 1706, a transport block on a downlink in accordance with the communication diversity configuration. The transmission component 1704 may transmit, to a UE, antenna configuration information associated with configuring a set of antennas of the UE. The transmission component 1704 may transmit, to the UE, downlink data using a base station antenna configuration corresponding to a UE antenna configuration selected based at least in part on the antenna configuration information.

The reception component 1702 may receive, from the apparatus 1706, an antenna configuration report identifying a UE antenna configuration for a set of antenna panels of the apparatus 1706. The reception component 1702 and/or the transmission component 1704 may communicate with the apparatus 1706 using a base station antenna configuration corresponding to the UE antenna configuration based at least in part on receiving the antenna configuration report.

The transmission component 1704 may transmit, to the apparatus 1706, antenna configuration information associated with configuring a set of antennas of the apparatus 1706. The reception component 1702 may receive, from the apparatus 1706, uplink data using a base station antenna configuration corresponding to a UE antenna configuration of the apparatus 1706 selected based at least in part on the antenna configuration information. The reception component 1702 may perform one or more measurements of one or more SRSs and the transmission component 1704 may transmit information associated with identifying a selection of a configuration for the apparatus 1706.

The determination component 1708 may determine a communication diversity configuration, such as based at least in part on the reception component 1702 receive a measurement report from the apparatus 1706, receiving a request for an identification of the communication diversity configuration from the apparatus 1706, or receiving a signal for measurement by the reception component 1702, among other examples. In some aspects, the determination component 1708 may include one or more a transmit processor, a receive processor, a controller/processor, a memory, or a combination thereof, of the base station described above in connection with FIG. 2.

The antenna panel configuration component 1710 may determine an antenna configuration, such as based at least in part on a measurement report received from the apparatus 1706 and regarding one or more CSI measurements. The antenna panel configuration component 1710 may determine the antenna configuration for the apparatus 1700 (e.g., a Tx antenna configuration) or for the apparatus 1706 (e.g., an Rx antenna configuration, which the apparatus 1700 may signal to the apparatus 1706). The antenna panel configuration component 1710 may determine an antenna configuration, such as based at least in part on a measurement report received from the apparatus 1706 and regarding one or more CSI measurements or based at least in part on a measurement of an SRS. The antenna panel configuration component 1710 may determine an antenna configuration, such as based at least in part on a measurement of one or more SRSs. In some aspects, the antenna panel configuration component 1710 may include one or more antennas, a modulator, a transmit MIMO processor, a transmit processor, a controller/processor, a memory, or a combination thereof, of the base station described above in connection with FIG. 2.

The measurement component 1712 may perform at least one of a polarization sweeping procedure or a beam sweeping procedure to perform a set of measurements on, for example, one or more SRSs to enable a selection of an antenna configuration by the antenna panel configuration component 1710. In some aspects, the measurement component 1712 may include one or more antennas, a demodulator, a MIMO detector, a receive processor, a controller/processor, a memory, or a combination thereof, of the UE described above in connection with FIG. 2.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
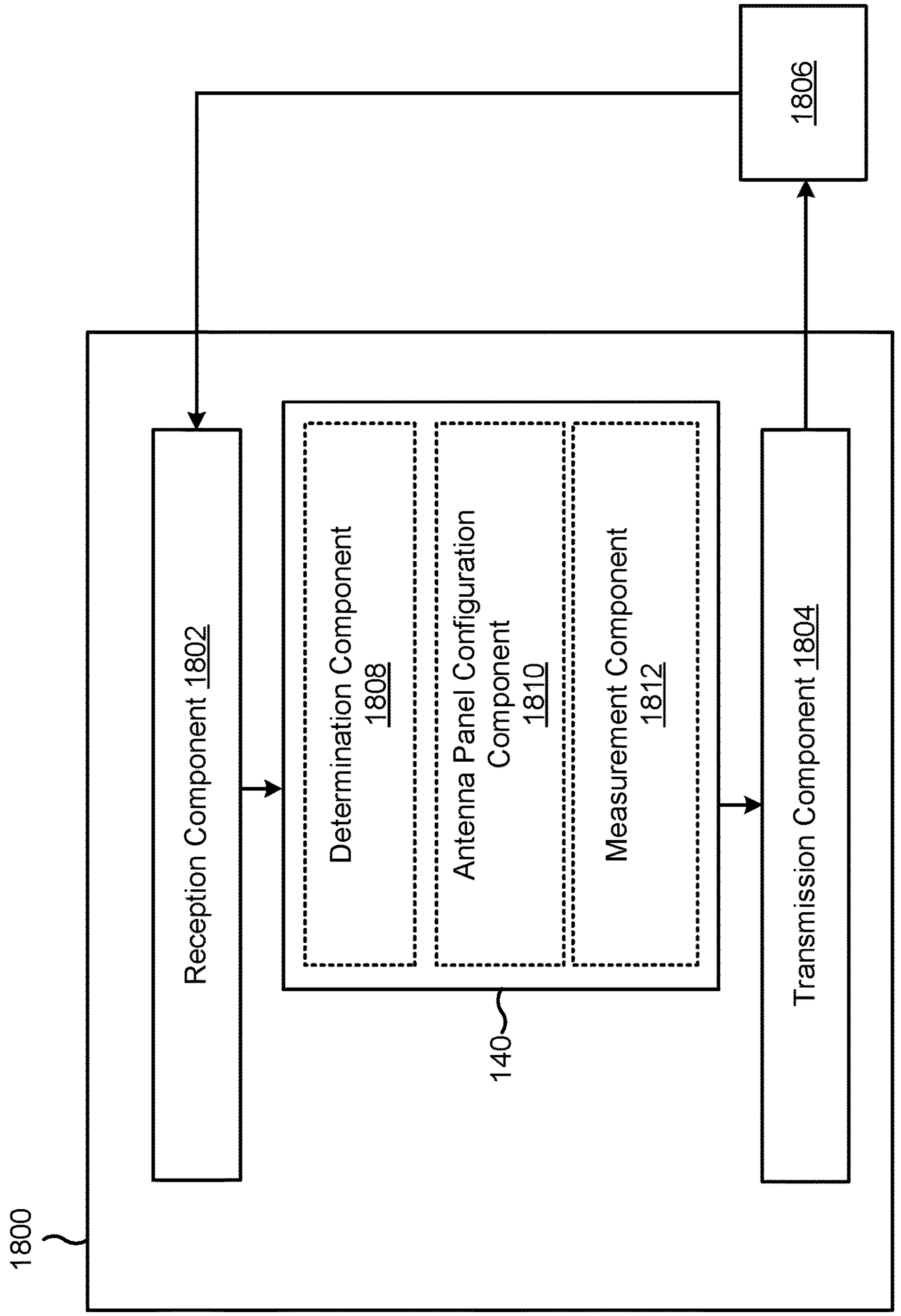

FIG. 18 is a block diagram of an example apparatus 1800 for wireless communication. The apparatus 1800 may be a UE, or a UE may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include a determination component 1808, among other examples.

In some aspects, the apparatus 1800 may be configured to perform one or more operations described herein in connection with FIG. 5. Additionally, or alternatively, the apparatus 1800 may be configured to perform one or more processes described herein, such as process 700 of FIG. 7, among other examples. In some aspects, the apparatus 1800 and/or one or more components shown in FIG. 18 may include one or more components of the UE described above in connection with FIG. 2. Additionally, or alternatively, one or more components shown in FIG. 18 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a demodulator, a MIMO detector, a receive processor, a controller/processor, a memory, or a combination thereof, of the UE described above in connection with FIG. 2.

The transmission component 1804 may transmit communications, such as reference signals, control information, data communications, or a combination thereof, to the apparatus 1806. In some aspects, one or more other components of the apparatus 1806 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the UE described above in connection with FIG. 2. In some aspects, the transmission component 1804 may be collocated with the reception component 1802 in a transceiver.

The reception component 1802 may receive, from the apparatus 1806, information associated with identifying a communication diversity configuration. The reception component 1802 may receive, from the apparatus 1806, a transport block on a downlink in accordance with the communication diversity configuration. The reception component 1802 may receive, from the apparatus 1806, antenna configuration information associated with configuring a set of antennas of the UE. The reception component 1802 may receive, from the apparatus 1806, downlink data using an antenna configuration selected based at least in part on the antenna configuration information. The reception component 1802 may receive, from the apparatus 1806, antenna configuration information associated with configuring a set of antennas of the UE. The transmission component 1804 may transmit, to the apparatus 1806, uplink data using an antenna configuration selected based at least in part on the antenna configuration information.

The transmission component 1804 may transmit, to the apparatus 1806, an antenna configuration report identifying an antenna configuration for a set of antenna panels of the apparatus 1800. The reception component 1802 and/or the transmission component 1804 may communicate with the apparatus 1806 using the antenna configuration based at least in part on transmitting the antenna configuration report.

The determination component 1808 may determine a communication diversity configuration based at least in part on the information associated with identifying the communication diversity configuration. The determination component 1808 may cause the reception component 1802 to receive and measure one or more signals and the transmission component 1804 to transmit one or more signals for measurement or to report a measurement by the reception component 1802. In some aspects, the determination component 1808 may include one or more antennas, a modulator, a transmit MIMO processor, a transmit processor, a controller/processor, a memory, or a combination thereof, of the UE described above in connection with FIG. 2.

The antenna panel configuration component 1810 may configure at least one of a panel selection or a polarization selection based at least in part on the antenna configuration information. In some aspects, the antenna panel configuration component 1810 may select a panel or polarization based at least in part on a report of an SRS measurement from the apparatus 1806, the antenna configuration information, a CSI-RS measurement, an SRS measurement, or selection information received from the apparatus 1806, among other examples. In some aspects, the antenna panel configuration component 1810 may include one or more antennas, a demodulator, a MIMO detector, a receive processor, a controller/processor, a memory, or a combination thereof, of the UE described above in connection with FIG. 2.

The measurement component 1812 may perform at least one of a polarization sweeping procedure or a beam sweeping procedure to perform a set of measurements on, for example, one or more CSI-RSs to enable a selection of an antenna configuration. The measurement component 1812 may cause the apparatus 800 to perform an SRS sweeping procedure or a CSI-RS measurement procedure to enable a selection of an antenna configuration. In some aspects, the measurement component 1812 may include one or more antennas, a demodulator, a MIMO detector, a receive processor, a controller/processor, a memory, or a combination thereof, of the UE described above in connection with FIG. 2.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a base station, comprising: transmitting, to a user equipment (UE), information associated with identifying a communication diversity configuration; and transmitting, to the UE, a transport block on a downlink in accordance with the communication diversity configuration.

Aspect 2: The method of Aspect 1, wherein transmitting the transport block in accordance with communication diversity configuration comprises: transmitting the transport block using at least one of: a plurality of time slots, a plurality of frequency locations, a plurality of transmit or receive polarizations, a plurality of transmit or receive panels, or a plurality of transmit or receive beams.

Aspect 3: The method of any of Aspects 1 to 2, wherein transmitting the information associated with identifying the communication diversity configuration comprises: transmitting, using dynamic signaling, information identifying a selection of the communication diversity configuration for the UE to use in receiving the transport block.

Aspect 4: The method of any of Aspects 1 to 3, wherein transmitting the information associated with identifying the communication diversity configuration comprises: transmitting information identifying a non-random sequence of communication diversity configurations that the UE is to use for receiving a set of transport blocks that includes the transport block.

Aspect 5: The method of any of Aspects 1 to 3, wherein transmitting the information associated with identifying the communication diversity configuration comprises: transmitting information identifying a pseudo-random sequence of communication diversity configurations that the UE is to use for receiving a set of transport blocks that includes the transport block.

Aspect 6: The method of any of Aspects 1 to 5, further comprising: receiving a report associated with identifying one or more measurements; and wherein transmitting the information associated with identifying the communication diversity configuration comprises: transmitting the information associated with identifying the communication diversity configuration based at least in part on receiving the report.

Aspect 7: The method of any of Aspects 1 to 6, further comprising: receiving a UE request for an identification of the communication diversity configuration; and wherein transmitting the information associated with identifying the communication diversity configuration comprises: transmitting the information associated with identifying the communication diversity configuration based at least in part on receiving the UE request.

Aspect 8: The method of any of Aspects 1 to 7, wherein transmitting the information associated with identifying the communication diversity configuration comprises: transmitting the information to identify a base station communication diversity configuration to enable a selection of a corresponding UE communication diversity configuration.

Aspect 9: A method of wireless communication performed by a user equipment (UE), comprising: receiving, from a base station (BS), information associated with identifying a communication diversity configuration; and receiving, from the BS, a transport block on a downlink in accordance with the communication diversity configuration.

Aspect 10: The method of Aspect 9, wherein receiving the transport block in accordance with communication diversity configuration comprises: receiving the transport block using at least one of: a plurality of time slots, a plurality of frequency locations, a plurality of transmit or receive polarizations, a plurality of transmit or receive panels, or a plurality of transmit or receive beams.

Aspect 11: The method of any of Aspects 9 to 10, wherein receiving the information associated with identifying the communication diversity configuration comprises: receiving, using dynamic signaling, information identifying a selection of the communication diversity configuration for receiving the transport block.

Aspect 12: The method of any of Aspects 9 to 11, wherein receiving the information associated with identifying the communication diversity configuration comprises: receiving information identifying a non-random sequence of communication diversity configurations for receiving a set of transport blocks that includes the transport block.

Aspect 13: The method of any of Aspects 9 to 12, wherein receiving the information associated with identifying the communication diversity configuration comprises: receiving information identifying a pseudo-random sequence of communication diversity configurations for receiving a set of transport blocks that includes the transport block.

Aspect 14: The method of any of Aspects 9 to 13, further comprising: performing one or more measurements of one or more signals; and transmitting a report associated with identifying the one or more measurements; and wherein receiving the information associated with identifying the communication diversity configuration comprises: receiving the information associated with identifying the communication diversity configuration based at least in part on transmitting the report.

Aspect 15: The method of any of Aspects 9 to 14, further comprising: transmitting a request for an identification of the communication diversity configuration; and wherein receiving the information associated with identifying the communication diversity configuration comprises: receiving the information associated with identifying the communication diversity configuration based at least in part on transmitting the request.

Aspect 16: The method of any of Aspects 9 to 15, wherein receiving the information associated with identifying the communication diversity configuration comprises: receiving information identifying a base station communication diversity configuration; and selecting a corresponding UE communication diversity configuration to use for receiving the transport block.

Aspect 17: A method of wireless communication performed by a user equipment (UE), comprising: receiving, from a base station, antenna configuration information associated with configuring a set of antennas of the UE; and receiving, from the base station, downlink data using an antenna configuration selected based at least in part on the antenna configuration information.

Aspect 18: The method of Aspect 1, further comprising: configuring at least one of a panel selection or a polarization selection based at least in part on the antenna configuration information.

Aspect 19: The method of any of Aspects 1 to 18, wherein the antenna configuration information includes information identifying a set of channel state information reference signal resources; and further comprising: performing at least one of polarization sweeping or panel sweeping to perform a set of measurements using the set of channel state information reference signal resources; and selecting the antenna configuration based at least in part on the set of measurements.

Aspect 20: The method of any of Aspects 1 to 19, wherein the antenna configuration information includes information identifying a set of channel state information reference signal resources; and further comprising: performing a set of measurements using the set of channel state information reference signal resources; and transmitting a layer 1 measurement report identifying the set of measurements.

Aspect 21: The method of Aspect 20, wherein the set of measurements is associated with a set of possible polarization selections or panel selections of the UE, and wherein the set of measurements includes at least one of: a signal to interference and noise ratio measurement, or a reference signal received power measurement.

Aspect 22: The method of any of Aspects 1 to 21, wherein the antenna configuration information includes information identifying a measurement configuration for a set of channel state information reference signal measurements; and wherein the measurement configuration includes information indicating that the UE is to perform at least one of: a set of polarization sweeping measurements for a single beam, a set of panel sweeping measurements for the single beam, a set of polarization sweeping measurements for a plurality of beams, or a set of panel sweeping measurements for the plurality of beams.

Aspect 23: The method of any of Aspects 1 to 22, wherein the antenna configuration information includes information identifying a report configuration for measurement reporting, and wherein the report configuration includes information indicating that measurement reporting is to include at least one of: a polarization report, a panel report, or a receive beam report.

Aspect 24: The method of any of Aspects 1 to 23, further comprising: transmitting, to the base station, a measurement report including one or more measurements performed based at least in part on the antenna configuration information; and receiving, from the base station, selection information identifying at least one of: a polarization selection, or a panel selection.

Aspect 25: The method of Aspect 24, wherein the selection information is received using at least one of: a downlink control information, or a medium access control control element.

Aspect 26: The method of any of Aspects 1 to 25, wherein the antenna configuration information includes information identifying a delay configuration, wherein the delay configuration is for receiving at least one of a polarization selection or a panel selection.

Aspect 27: The method of Aspect 26, wherein the delay configuration is based at least in part on a UE capability.

Aspect 28: A method of wireless communication performed by a base station, comprising: transmitting, to a user equipment (UE), antenna configuration information associated with configuring a set of antennas of the UE; and transmitting, to the UE, downlink data using a base station antenna configuration corresponding to a UE antenna configuration selected based at least in part on the antenna configuration information.

Aspect 29: The method of Aspect 28, further comprising: transmitting the antenna configuration information to configure at least one of a panel selection or a polarization selection.

Aspect 30: The method of any of Aspects 28 to 29, wherein the antenna configuration information includes information identifying a set of channel state information reference signal resources; and further comprising: receiving a layer 1 measurement report identifying a set of measurements or the set of channel state information reference signal resources.

Aspect 31: The method of any of Aspects 28 to 30, wherein the set of measurements is associated with a set of possible polarization selections or panel selections of the UE, and wherein the set of measurements includes at least one of: a signal to interference and noise ratio measurement, or a reference signal received power measurement.

Aspect 32: The method of any of Aspects 28 to 31, wherein the antenna configuration information includes information identifying a measurement configuration for a set of channel state information reference signal measurements; and wherein the measurement configuration includes information indicating that the UE is to perform at least one of: a set of polarization sweeping measurements for a single beam, a set of panel sweeping measurements for the single beam, a set of polarization sweeping measurements for a plurality of beams, or a set of panel sweeping measurements for the plurality of beams.

Aspect 33: The method of any of Aspects 28 to 32, wherein the antenna configuration information includes information identifying a report configuration for measurement reporting, and wherein the report configuration includes information indicating that measurement reporting is to include at least one of: a polarization report, a panel report, or a receive beam report.

Aspect 34: The method of any of Aspects 28 to 33, further comprising: receiving, from the UE, a measurement report including one or more measurements performed based at least in part on the antenna configuration information; and transmitting, to the UE, selection information identifying at least one of: a polarization selection, or a panel selection.

Aspect 35: The method of Aspect 34, wherein the selection information is transmitted using at least one of: a downlink control information, or a medium access control control element.

Aspect 36: The method of any of Aspects 28 to 35, wherein the antenna configuration information includes information identifying a delay configuration, wherein the delay configuration is for the UE to receive at least one of a polarization selection or a panel selection.

Aspect 37: The method of Aspect 36, wherein the delay configuration is based at least in part on a UE capability.

Aspect 38: A method of wireless communication performed by a user equipment (UE), comprising: transmitting, to a base station, an antenna configuration report identifying an antenna configuration for a set of antenna panels of the UE; and communicating with the base station using the antenna configuration based at least in part on transmitting the antenna configuration report.

Aspect 39: The method of Aspect 38, wherein the antenna configuration report includes information identifying at least one of: a polarization selection, an antenna panel selection, or a beam selection.

Aspect 40: The method of any of Aspects 38 to 39, wherein the antenna configuration report is a periodic report.

Aspect 41: The method of any of Aspects 38 to 40, further comprising: receiving a request to transmit the antenna configuration report; and wherein transmitting the antenna configuration report comprises: transmitting the antenna configuration report aperiodically as a response to the request.

Aspect 42: The method of any of Aspects 38 to 41, further comprising: determining to change the antenna configuration; and wherein transmitting the antenna configuration report comprises: transmitting the antenna configuration report using a set of pre-configured resources based at least in part on determining to change the antenna configuration.

Aspect 43: The method of any of Aspects 38 to 42, further comprising: receiving a command to perform a sounding reference signal sweep based at least in part on transmitting the antenna configuration report; and aligning to a polarization of the base station based at least in part on the sounding reference signal sweep.

Aspect 44: The method of any of Aspects 38 to 43, further comprising: receiving an indication of a set of channel state information reference signal resources based at least in part on transmitting the antenna configuration report; performing one or more measurements of the set of channel state information reference signal resources using the antenna configuration; and transmitting a report of the one or more measurements.

Aspect 45: The method of any of Aspects 38 to 44, wherein the antenna configuration report includes information identifying at least one of: a transmit beam and a reception beam that is different from the transmit beam, a transmit antenna panel and a reception antenna panel that is different from the transmit antenna panel, or a transmit polarization and a reception polarization that is different from the transmit polarization.

Aspect 46: The method of any of Aspects 38 to 45, wherein the antenna configuration report includes information identifying an index of at least one of one or more polarizations, one or more antenna panels, or one or more beams or the index and a measurement of the at least one of the one or more polarizations, the one or more antenna panels, or the one or more beams.

Aspect 47: A method of wireless communication performed by a base station, comprising: receiving, from a user equipment (UE), an antenna configuration report identifying a UE antenna configuration for a set of antenna panels of the UE; and communicating with the UE using a base station antenna configuration corresponding to the UE antenna configuration based at least in part on receiving the antenna configuration report.

Aspect 48: The method of Aspect 47, wherein the antenna configuration report includes information identifying at least one of: a polarization selection, an antenna panel selection, or a beam selection.

Aspect 49: The method of any of Aspects 47 to 48, wherein the antenna configuration report is a periodic report.

Aspect 50: The method of any of Aspects 47 to 49, further comprising: transmitting a request for the UE to transmit the antenna configuration report; and wherein receiving the antenna configuration report comprises: receiving the antenna configuration report aperiodically as a response to the request.

Aspect 51: The method of any of Aspects 47 to 50, wherein receiving the antenna configuration report comprises: receiving the antenna configuration report using a set of pre-configured resources based at least in part on a UE determination to change the UE antenna configuration.

Aspect 52: The method of any of Aspects 47 to 51, further comprising: transmitting a command to perform a sounding reference signal sweep based at least in part on receiving the antenna configuration report and to align the UE to a polarization of the base station.

Aspect 53: The method of any of Aspects 47 to 52, further comprising: transmitting an indication of a set of channel state information reference signal resources based at least in part on receiving the antenna configuration report; and receiving a report of one or more measurements of the set of channel state information reference signal resources.

Aspect 54: The method of any of Aspects 47 to 53, wherein the antenna configuration report includes information identifying at least one of: a transmit beam and a reception beam that is different from the transmit beam, a transmit antenna panel and a reception antenna panel that is different from the transmit antenna panel, or a transmit polarization and a reception polarization that is different from the transmit polarization.

Aspect 55: The method of any of Aspects 47 to 54, wherein the antenna configuration report includes information identifying an index of at least one of one or more polarizations, one or more antenna panels, or one or more beams or the index and a measurement of the at least one of the one or more polarizations, the one or more antenna panels, or the one or more beams.

Aspect 56: A method of wireless communication performed by a user equipment (UE), comprising: receiving, from a base station, antenna configuration information associated with configuring a set of panels of the UE; and transmitting, to the base station, uplink data using an antenna configuration selected based at least in part on the antenna configuration information.

Aspect 57: The method of Aspect 56, further comprising: configuring at least one of a panel selection or a polarization selection based at least in part on the antenna configuration information.

Aspect 58: The method of any of Aspects 56 to 57, wherein the antenna configuration information includes information identifying a set of sounding reference signal resources; and further comprising: performing, using the set of sounding reference signal resources, at least one of polarization sweeping or panel sweeping to enable a set of measurements; receiving, from the base station, a feedback report generated based at least in part on the set of measurements; and selecting the antenna configuration based at least in part on feedback report.

Aspect 59: The method of Aspect 58, wherein the set of sounding reference signal resources is a set of periodic resources or aperiodic resources.

Aspect 60: The method of any of Aspects 56 to 59, wherein the antenna configuration information includes information identifying a sounding reference signal sweeping configuration; and wherein the sounding reference signal sweeping configuration indicates that the UE is to perform at least one of: polarization sweeping for a single beam, panel sweeping for a single beam, polarization sweeping for a plurality of beams, or panel sweeping for a plurality of beams.

Aspect 61: The method of any of Aspects 56 to 60, wherein receiving antenna configuration information comprises: receiving an indication the antenna configuration derived based at least in part on a set of sounding reference signal measurements.

Aspect 62: The method of Aspect 61, wherein the indication includes a sounding reference signal resource indicator or antenna port indicator identifying, for the uplink data, a transmission parameter, wherein the transmission parameter is at least one of: a beam, a panel, or a polarization.

Aspect 63: The method of Aspect 62, further comprising: determining the transmission parameter based at least in part on a mapping between a first value for the transmission parameter and a second value for the sounding reference signal resource indicator or the antenna port indicator.

Aspect 64: The method of any of Aspects 56 to 63, wherein the antenna configuration information includes information identifying a delay configuration, wherein the delay configuration is for receiving at least one of a polarization selection or a panel selection and is based at least in part on a UE capability.

Aspect 65: A method of wireless communication performed by a base station, comprising: transmitting, to a user equipment (UE), antenna configuration information associated with configuring a set of panels of the UE; and receiving, from the UE, uplink data using a base station antenna configuration corresponding to a UE antenna configuration selected based at least in part on the antenna configuration information.

Aspect 66: The method of Aspect 65, further comprising: transmitting the antenna configuration information to configure at least one of a panel selection or a polarization selection.

Aspect 67: The method of any of Aspects 65 to 66, wherein the antenna configuration information includes information identifying a set of sounding reference signal resources; and further comprising: performing a set of measurements on polarization sweeping or panel sweeping transmissions using the set of sounding reference signal resources; and transmitting, to the UE, a feedback report, identifying the UE antenna configuration, generated based at least in part on the set of measurements.

Aspect 68: The method of Aspect 67, wherein the set of sounding reference signal resources is a set of periodic resources or aperiodic resources.

Aspect 69: The method of any of Aspects 65 to 68, wherein the antenna configuration information includes information identifying a sounding reference signal sweeping configuration; and wherein the sounding reference signal sweeping configuration indicates that the UE is to perform at least one of: polarization sweeping for a single beam, panel sweeping for a single beam, polarization sweeping for a plurality of beams, or panel sweeping for a plurality of beams.

Aspect 70: The method of any of Aspects 65 to 69, wherein transmitting the antenna configuration information comprises: transmitting an indication that includes a sounding reference signal resource indicator or an antenna port indicator identifying, for the uplink data, a transmission parameter, wherein the transmission parameter is at least one of: a beam, a panel, or a polarization.

Aspect 71: The method of Aspect 70, further comprising: providing information identifying a mapping between a first value for the transmission parameter and a second value for the sounding reference signal resource indicator or the antenna port indicator to enable the UE to determine the transmission parameter.

Aspect 72: The method of any of Aspects 65 to 71, wherein the antenna configuration information includes information identifying a delay configuration, wherein the delay configuration is for transmitting at least one of a polarization selection or a panel selection and is based at least in part on a UE capability.

Aspect 73: An apparatus for wireless communication at a device, comprising a processor; memory coupled with the processor; and instructions stored in the memory and executable by the processor to cause the apparatus to perform the method of one or more of Aspects 1-8.

Aspect 74: A device for wireless communication, comprising a memory and one or more processors coupled to the memory, the one or more processors configured to perform the method of one or more of Aspects 1-8.

Aspect 75: An apparatus for wireless communication, comprising at least one means for performing the method of one or more of Aspects 1-8.

Aspect 76: A non-transitory computer-readable medium storing code for wireless communication, the code comprising instructions executable by a processor to perform the method of one or more of Aspects 1-8.

Aspect 77: A non-transitory computer-readable medium storing a set of instructions for wireless communication, the set of instructions comprising one or more instructions that, when executed by one or more processors of a device, cause the device to perform the method of one or more of Aspects 1-8.

Aspect 78: An apparatus for wireless communication at a device, comprising a processor; memory coupled with the processor; and instructions stored in the memory and executable by the processor to cause the apparatus to perform the method of one or more of Aspects 9-16.

Aspect 79: A device for wireless communication, comprising a memory and one or more processors coupled to the memory, the one or more processors configured to perform the method of one or more of Aspects 9-16.

Aspect 80: An apparatus for wireless communication, comprising at least one means for performing the method of one or more of Aspects 9-16.

Aspect 81: A non-transitory computer-readable medium storing code for wireless communication, the code comprising instructions executable by a processor to perform the method of one or more of Aspects 9-16.

Aspect 82: A non-transitory computer-readable medium storing a set of instructions for wireless communication, the set of instructions comprising one or more instructions that, when executed by one or more processors of a device, cause the device to perform the method of one or more of Aspects 9-16.

Aspect 83: An apparatus for wireless communication at a device, comprising a processor; memory coupled with the processor; and instructions stored in the memory and executable by the processor to cause the apparatus to perform the method of one or more of Aspects 17-27.

Aspect 84: A device for wireless communication, comprising a memory and one or more processors coupled to the memory, the one or more processors configured to perform the method of one or more of Aspects 17-27.

Aspect 85: An apparatus for wireless communication, comprising at least one means for performing the method of one or more of Aspects 17-27.

Aspect 86: A non-transitory computer-readable medium storing code for wireless communication, the code comprising instructions executable by a processor to perform the method of one or more of Aspects 17-27.

Aspect 87: A non-transitory computer-readable medium storing a set of instructions for wireless communication, the set of instructions comprising one or more instructions that, when executed by one or more processors of a device, cause the device to perform the method of one or more of Aspects 17-27.

Aspect 88: An apparatus for wireless communication at a device, comprising a processor; memory coupled with the processor; and instructions stored in the memory and executable by the processor to cause the apparatus to perform the method of one or more of Aspects 28-37.

Aspect 89: A device for wireless communication, comprising a memory and one or more processors coupled to the memory, the one or more processors configured to perform the method of one or more of Aspects 28-37.

Aspect 90: An apparatus for wireless communication, comprising at least one means for performing the method of one or more of Aspects 28-37.

Aspect 91: A non-transitory computer-readable medium storing code for wireless communication, the code comprising instructions executable by a processor to perform the method of one or more of Aspects 28-37.

Aspect 92: A non-transitory computer-readable medium storing a set of instructions for wireless communication, the set of instructions comprising one or more instructions that, when executed by one or more processors of a device, cause the device to perform the method of one or more of Aspects 28-37.

Aspect 93: An apparatus for wireless communication at a device, comprising a processor; memory coupled with the processor; and instructions stored in the memory and executable by the processor to cause the apparatus to perform the method of one or more of Aspects 38-46.

Aspect 94: A device for wireless communication, comprising a memory and one or more processors coupled to the memory, the one or more processors configured to perform the method of one or more of Aspects 38-46.

Aspect 95: An apparatus for wireless communication, comprising at least one means for performing the method of one or more of Aspects 38-46.

Aspect 96: A non-transitory computer-readable medium storing code for wireless communication, the code comprising instructions executable by a processor to perform the method of one or more of Aspects 38-46.

Aspect 97: A non-transitory computer-readable medium storing a set of instructions for wireless communication, the set of instructions comprising one or more instructions that, when executed by one or more processors of a device, cause the device to perform the method of one or more of Aspects 38-46.

Aspect 98: An apparatus for wireless communication at a device, comprising a processor; memory coupled with the processor; and instructions stored in the memory and executable by the processor to cause the apparatus to perform the method of one or more of Aspects 47-55.

Aspect 99: A device for wireless communication, comprising a memory and one or more processors coupled to the memory, the one or more processors configured to perform the method of one or more of Aspects 47-55.

Aspect 100: An apparatus for wireless communication, comprising at least one means for performing the method of one or more of Aspects 47-55.

Aspect 101: A non-transitory computer-readable medium storing code for wireless communication, the code comprising instructions executable by a processor to perform the method of one or more of Aspects 47-55.

Aspect 102: A non-transitory computer-readable medium storing a set of instructions for wireless communication, the set of instructions comprising one or more instructions that, when executed by one or more processors of a device, cause the device to perform the method of one or more of Aspects 47-55.

Aspect 103: An apparatus for wireless communication at a device, comprising a processor; memory coupled with the processor; and instructions stored in the memory and executable by the processor to cause the apparatus to perform the method of one or more of Aspects 56-64.

Aspect 104: A device for wireless communication, comprising a memory and one or more processors coupled to the memory, the one or more processors configured to perform the method of one or more of Aspects 56-64.

Aspect 105: An apparatus for wireless communication, comprising at least one means for performing the method of one or more of Aspects 56-64.

Aspect 106: A non-transitory computer-readable medium storing code for wireless communication, the code comprising instructions executable by a processor to perform the method of one or more of Aspects 56-64.

Aspect 107: A non-transitory computer-readable medium storing a set of instructions for wireless communication, the set of instructions comprising one or more instructions that, when executed by one or more processors of a device, cause the device to perform the method of one or more of Aspects 56-64.

Aspect 108: An apparatus for wireless communication at a device, comprising a processor; memory coupled with the processor; and instructions stored in the memory and executable by the processor to cause the apparatus to perform the method of one or more of Aspects 65-72.

Aspect 109: A device for wireless communication, comprising a memory and one or more processors coupled to the memory, the one or more processors configured to perform the method of one or more of Aspects 65-72.

Aspect 110: An apparatus for wireless communication, comprising at least one means for performing the method of one or more of Aspects 65-72.

Aspect 111: A non-transitory computer-readable medium storing code for wireless communication, the code comprising instructions executable by a processor to perform the method of one or more of Aspects 65-72.

Aspect 112: A non-transitory computer-readable medium storing a set of instructions for wireless communication, the set of instructions comprising one or more instructions that, when executed by one or more processors of a device, cause the device to perform the method of one or more of Aspects 65-72.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a “processor” is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, “satisfying a threshold” may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to “at least one of” a list of items refers to any combination of those items, including single members. As an example, “at least one of: a, b, or c” is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles “a” and “an” are intended to include one or more items and may be used interchangeably with “one or more.” Further, as used herein, the article “the” is intended to include one or more items referenced in connection with the article “the” and may be used interchangeably with “the one or more.” Furthermore, as used herein, the terms “set” and “group” are intended to include one or more items and may be used interchangeably with “one or more.” Where only one item is intended, the phrase “only one” or similar language is used. Also, as used herein, the terms “has,” “have,” “having,” or the like are intended to be open-ended terms that do not limit an element that they modify (e.g., an element “having” A may also have B). Further, the phrase “based on” is intended to mean “based, at least in part, on” unless explicitly stated otherwise. Also, as used herein, the term “or” is intended to be inclusive when used in a series and may be used interchangeably with “and/or,” unless explicitly stated otherwise (e.g., if used in combination with “either” or “only one of”).

What is claimed is:

1. A user equipment (UE) for wireless communication, comprising:

one or more memories; and one or more processors, coupled to the one or more memories, configured to:

change a polarization selection of an antenna panel of the UE;

transmit, to a network entity and based at least in part on changing the polarization selection, an antenna configuration report associated with a set of antenna panels of the UE, wherein the antenna configuration report includes information identifying the change to the polarization selection;

receive, from the network entity, a command in response to the antenna configuration report;

transmit, to the network entity and triggered by the command, a set of sounding reference signals; and communicate with the network entity using an antenna configuration determined based at least in part on the set of sounding reference signals.

2. The UE of claim 1, wherein the antenna configuration report includes information further identifying at least one of: a change to an antenna panel selection or a change to a beam selection.

3. The UE of claim 1, wherein the one or more processors are further configured to receive a request for the antenna configuration report and transmit the antenna configuration report in response to the request.

4. The UE of claim 1, wherein the one or more processors are configured to transmit the antenna configuration report using pre-configured uplink resources.

5. The UE of claim 1, wherein the set of sounding reference signals includes sounding reference signals transmitted using a plurality of polarization configurations.

6. The UE of claim 1, wherein the one or more processors are configured to align to a polarization of the network entity based at least in part on a result of transmitting the set of sounding reference signals.

7. The UE of claim 1, wherein the antenna configuration report includes a ranking of multiple antenna configurations evaluated by the UE.

8. The UE of claim 1, wherein the antenna configuration is used for both uplink and downlink communication.

9. The UE of claim 1, wherein the one or more processors are configured to select the antenna configuration from a predefined set of configurations stored in the one or more memories.

10. The UE of claim 1, wherein the one or more processors are further configured to determine channel quality associated with each antenna configuration prior to transmitting the antenna configuration report.

11. The UE of claim 1, wherein the one or more processors are configured to transmit the antenna configuration report via an uplink control channel.

12. The UE of claim 1, wherein the one or more processors are configured to transmit the antenna configuration report periodically.

13. The UE of claim 1, wherein the antenna configuration report identifies a first configuration for transmission and a second configuration for reception.

14. A method of wireless communication performed by a user equipment (UE), comprising:

changing a polarization selection of an antenna panel of the UE;

transmitting, to a network entity and based at least in part on changing the polarization selection, an antenna configuration report associated with a set of antenna panels of the UE, wherein the antenna configuration report includes information identifying the change to the polarization selection;

receiving, from the network entity, a command in response to the antenna configuration report;

transmitting, to the network entity and triggered by the command, a set of sounding reference signals; and communicating with the network entity using an antenna configuration determined based at least in part on the set of sounding reference signals.

15. The method of claim 14, wherein the antenna configuration report includes information identifying at least one of: a polarization selection, an antenna panel selection, or a beam selection.

16. The method of claim 14, wherein transmitting the antenna configuration report comprises using pre-configured uplink resources.

17. The method of claim 14, wherein transmitting the set of sounding reference signals comprises transmitting with different polarization configurations.

18. The method of claim 14, further comprising aligning to a polarization of the network entity based at least in part on a result of transmitting the set of sounding reference signals.

19. The method of claim 14, wherein the antenna configuration report includes information further identifying at least one of: a change to an antenna panel selection or a change to a beam selection.

20. A non-transitory computer-readable medium storing a set of instructions for wireless communication, the set of instructions comprising:

one or more instructions that, when executed by one or more processors of a user equipment (UE), cause the UE to:

change a polarization selection of an antenna panel of the UE;

transmit, to a network entity and based at least in part on changing the polarization selection, an antenna configuration report associated with a set of antenna panels of the UE, wherein the antenna configuration report includes information identifying the change to the polarization selection;

receive, from the network entity, a command in response to the antenna configuration report;

transmit, to the network entity and triggered by the command, a set of sounding reference signals; and communicate with the network entity using an antenna configuration determined based at least in part on the set of sounding reference signals.

* * * * *